US006039164A

United States Patent [19]

Waters et al.

[11] Patent Number: 6,039,164

[45] Date of Patent: Mar. 21, 2000

[54] AUTOMATIC VALIDATING FAREBOX SYSTEM AND METHOD

[75] Inventors: Brian G. Waters; Gregory E. Stoltz, both of Dallas; Algert J. Maldanis, Heath, all of Tex.

[73] Assignee: Agent Systems, Inc., Dallas, Tex.

[21] Appl. No.: 09/059,274

[22] Filed: Apr. 13, 1998

[51] Int. Cl.[7] .................................. G07F 7/04; G07F 9/10; G06F 7/00; B65H 29/44

[52] U.S. Cl. .......................... 194/206; 194/217; 194/350; 271/181

[58] Field of Search .................................... 194/350, 217, 194/200, 206, 207; 271/180, 181, 177

[56] References Cited

U.S. PATENT DOCUMENTS

| | | | |
|---|---|---|---|
| 2,731,621 | 1/1956 | Sontheimer | 194/207 |
| 4,210,801 | 7/1980 | Gomez et al. | 235/92 |
| 4,310,749 | 1/1982 | Gomez et al. | 235/29 |
| 4,372,478 | 2/1983 | Gomez et al. | 232/12 |
| 4,376,442 | 3/1983 | Gomez et al. | 133/3 |
| 4,380,316 | 4/1983 | Glinka et al. | 232/16 |
| 4,407,312 | 10/1983 | Davila et al. | 133/8 |
| 4,453,667 | 6/1984 | Zerfahs | 232/7 |
| 4,471,905 | 9/1984 | Sloma et al. | 232/12 |
| 4,474,281 | 10/1984 | Roberts et al. | 194/1 |
| 4,730,117 | 3/1988 | Zack | 250/568 |
| 4,733,765 | 3/1988 | Watanabe | 194/206 |
| 4,765,607 | 8/1988 | Zouzoulas | 271/180 |
| 4,795,087 | 1/1989 | Procak | 232/7 |
| 4,877,179 | 10/1989 | Baker et al. | 232/7 |
| 4,977,502 | 12/1990 | Baker et al. | 364/405 |
| 5,225,665 | 7/1993 | Zerfahs et al. | 235/384 |
| 5,574,441 | 11/1996 | Roes et al. | 340/870 |
| 5,579,886 | 12/1996 | Ishida et al. | 194/217 |
| 5,678,679 | 10/1997 | Berman | 194/350 |
| 5,875,879 | 3/1999 | Hawthorn | 194/350 |

*Primary Examiner*—Robert P. Olszewski
*Assistant Examiner*—Bryan Jaketic
*Attorney, Agent, or Firm*—Fulbright & Jaworski L.L.P.

[57] ABSTRACT

A system and method for providing automatic validation of fares collected is disclosed. An automatic validating farebox, being adapted for mobile use, such as in the cabin of a bus, and to provide convenient access to both patrons and an operator, includes validation mechanisms and circuitry to accept patron payment in both coin and note. All tendered payment is automatically validated as to acceptable tender as well as its value being electronically registered. Accordingly, the operator is freed from validating payment of a fare and may simply confirm that the registered value is the proper amount for the type of fare purchased. The automatic validating farebox also includes mechanisms adapted both to store accepted currency in an efficient manner as well as to present the collected currency in a manner readily acceptable for handling and counting.

59 Claims, 27 Drawing Sheets

AUTOMATIC VALIDATING FAREBOX SYSTEM AND METHOD

REFERENCE TO RELATED APPLICATIONS

The present application is related to concurrently filed, co-pending, and commonly assigned United States patent applications entitled: "System And Method For Providing Farebox Accountability," Ser. No. 09/059,241; "Configurable Cashbox," Ser. No. 09/059,694 and "System And Method For Coin Singulation," Ser. No. 09/060,033, the disclosures of which three applications are incorporated herein by reference.

TECHNICAL FIELD OF THE INVENTION

The present invention relates to an automated currency receiving farebox and, more particularly, to a farebox which receives, validates, tallies, and securely stores monies tendered without requiring operator intervention.

BACKGROUND OF THE INVENTION

It is common today to provide for the automated acceptance of currency in transactions. For example, transit busses in the United States and Canada are normally equipped with a farebox to collect fares from riders and securely store the coins, tokens, and bills used to pay these fares. These fareboxes are either non-registering or registering.

A non-registering farebox is typically a locked cashbox with an inspection area where the operator can view the monies inserted by a patron to determine if a proper amount has been tendered. After verification by the operator, a "dump" lever is actuated by the operator and the payment is dropped to a cashbox below. These non-registering fareboxes do not count monies, i.e., individual notes and coins and their denominations, accepted.

Currently registering fareboxes are the preferred farebox used in transit busses in the United States and Canada. A registering farebox is generally an electro-mechanical device which measures coins and bills by physical size, drops the coins to an inspection plate in an escrow area, keeps a record of all monies measured and accepted, deposits the accepted monies in a cashbox, and allows the operator to record other limited information using a simple keypad.

Prior art fareboxes make a determination of the value of coins by measuring the coin diameter. Therefore, these fareboxes are susceptible to erroneous determinations when presented objects of similar diameter, such as washers and slugs.

Prior art fareboxes make a determination of the value of notes by making an assumption that all documents inserted into a note acceptor of the farebox which are of a certain length are a particular value bank note, i.e., a one dollar note. However, this assumption is flawed as notes having a same length may be of a different denomination. Moreover, the item, although being of the correct length, may not be legal tender at all.

In order to compensate for the above described deficiencies, these fareboxes display the coins and notes to the operator for verification that valid coins and notes have been accepted. However, with the advent of color copiers and inexpensive desktop publishing, it is very simple to generate a counterfeit note sufficient to fool an operator when presented for verification in the escrow area of these prior art fareboxes. Similarly, as it is generally a number of coins that are tendered and these coins are presented on an inspection plate in an escrow area for viewing loosely, i.e., coins may be positioned in such a way as to obscure other coins, it is very difficult for the operator to verify the coins. This difficulty is compounded by the fact that there is typically a rush of patrons wishing to tender a fare, such as at a busy bus stop, and, accordingly, the operator is not afforded sufficient time to properly verify the monies tendered. Therefore, in addition to requiring a large amount of time and attention from an operator, verification of the accepted monies by these individuals is not very accurate.

After the coins and notes are accepted by the registering farebox and visually verified by the operator, they are dumped into a cashbox as was the case in the non-registering farebox. These cashboxes consist of heavy metal containers with separate compartments for coins and notes. Generally the compartments are of equal size and receive the coins and notes loosely. Accordingly, the notes are allowed to accumulate in any orientation and, therefore, require considerably more storage area than if neatly and tightly stacked.

At the end of a shift or at the end of a day, the bus returns to the garage where data generated by the registering farebox is read, the cashbox is removed and its contents dumped into a portable collection vault containing monies from other such cashboxes, and the cashbox is then replaced into the farebox. The collection vault may include separation of coins and notes or may allow their intermingling. However, regardless of their separation from the coins, the notes are loosely stored, thus requiring considerably more area than if stacked neatly. Moreover, as the notes are loose, they must be stacked and faced, i.e., oriented in the stack to all face a common direction, prior to their being counted and/or sorted by automated systems.

Furthermore, as the monies of a plurality of fareboxes are intermingled, the information read regarding the monies collected by the registering farebox cannot be utilized to reconcile the contents of each cashbox individually. Moreover, the information provided by the registering fareboxes is very limited. Initially it is noted that the accuracy of the amount of monies collected is almost entirely reliant on the verification of these monies by the operator through the glass of the farebox escrow area. Additionally, the information regarding the transactions which an operator may provide is very limited. For example, the number of events or types of fares selectable by the operator is very limited. Expanding the information possible to be entered by the operator is restricted in these systems as the keypad only includes a very limited number of keys for input, the farebox does not provide much information display for the operator, i.e., for prompting etcetera, and the operator's time is otherwise occupied with the task of verifying the accepted payments.

Therefore a need exists in the art for a farebox which provides reliable verification of monies collected, including both coins and notes, without the need for operator intervention.

A further need exists in the art for the automated verification system of the farebox to determine not only the validity of notes, but also the denomination of the notes.

A still further need exists in the art for the farebox to interact with patrons and operators to efficiently conduct transactions, such as through rapid acceptance and verification of monies, meaningful messaging to the patron and operator including displaying a tally of verified monies, allowing the operator robust information input, and compact storage of accepted notes and coins so as to present a unobtrusive farebox as well as to necessitate its emptying less often.

A yet further need exists in the art for the farebox to be adapted to allow for accurate reconciliation of the monies collected including robust storage of information with respect to transactions, identification of a cashbox in which the monies are stored, and reliable information regarding the amount of monies collected.

SUMMARY OF THE INVENTION

These and other objects, features and technical advantages are achieved by a system and method including a self contained transaction station, which in a preferred embodiment is a farebox, providing automated validation of both coins and notes. Validation is accomplished without operator intervention so as to more rapidly and accurately determine amounts tendered by patrons. Once determined to be legal tender through validation, coins and notes tendered are securely stored within the transaction station for later collection at a centralized facility.

The secure storage of the coins and notes is preferably accomplished in a manner so as to efficiently store a large number of individual coins and notes. Accordingly, a preferred embodiment of the present invention is adapted to store notes all in a common orientation. Furthermore, the preferred embodiment tightly compresses the stored notes to further reduce the storage space required. In order to allow automated separation of various denomination notes and counting thereof, the preferred embodiment of the present invention is further adapted to store all notes facing in a same direction, i.e., all faced either up or down. Accordingly, when removed from secure storage, the notes may be directly processed by automated means without the need for individual handling, such as for facing of the individual notes.

The coin and note validators of the preferred embodiment of the present invention are coupled to control circuitry which receives and stores information regarding the coins and notes verified for each transaction, i.e., transaction information. Preferably, a patron display panel is coupled to the control circuitry to provide feed back to patrons as to amounts of monies verified for a transaction. The patron display panel may also display instructions for patrons as well as other messages including advertisements.

Also coupled to the preferred embodiment of the control circuitry is an operator control unit (OCU). The OCU includes operator input means, such as a keypad, and an operator display panel. The OCU provides the operator with information with respect to amounts of monies verified for a transaction and allows the operator to input information associated with the transaction.

Additionally, the OCU provides for additional control functions such as identifying a particular operator authorized to operate the unit prior to enabling transaction conducting operations. The OCU may also provide other information to an operator periodically or upon query. Such information may include time, date, and location (where the OCU is coupled to location sensors such as a global positioning system (GPS)). Additionally, such information may include operating prompts, such as operator log in, operator log out, error conditions, current status, operation instructions, and information with respect to that stored in the control system.

The operator input means of the OCU preferably includes configurable components, such as soft keys, to allow expedited input of information by an operator. Accordingly, a preferred embodiment of the present invention includes programmable keys as a part of the OCU to provide for single, or reduced, keystroke entry of often entered information.

The control circuitry of the present invention is preferably adapted to interface with an external processor based system. Accordingly, information with respect to operation of the transaction station, including amounts of coins and notes stored therein, as well as identification of a removable container storing the coins and notes, may be communicated to the processor based system for subsequent use in accounting and/or reconciliation of the collected monies.

In a preferred embodiment, the control circuitry permits access to a removable container storing the collected monies after successfully interfacing with the processor based system to download stored information thereto as well as to up load information therefrom. Such access may be provided through the releasing of an access door upon successful download of particular information from the control circuitry to the processor based system.

The control circuitry may also include an interface to communicate with a host environment in which the transaction station is deployed. For example, the transaction station may be mounted in a city bus, from which information such as a position, possibly from a GPS system mounted therein or an odometer reading therefrom, may be received. This information is preferably stored along with the aforementioned transaction information for provision to the processor based system for analysis.

Although providing secure storage of verified monies, the present invention is preferably adapted to allow operator access to coin and/or note feed paths within the transaction station prior to the coins and notes being validated. Accordingly, an operator is enabled to clear many jams and miss-feeds manually, without compromising the security of the monies already accounted for.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
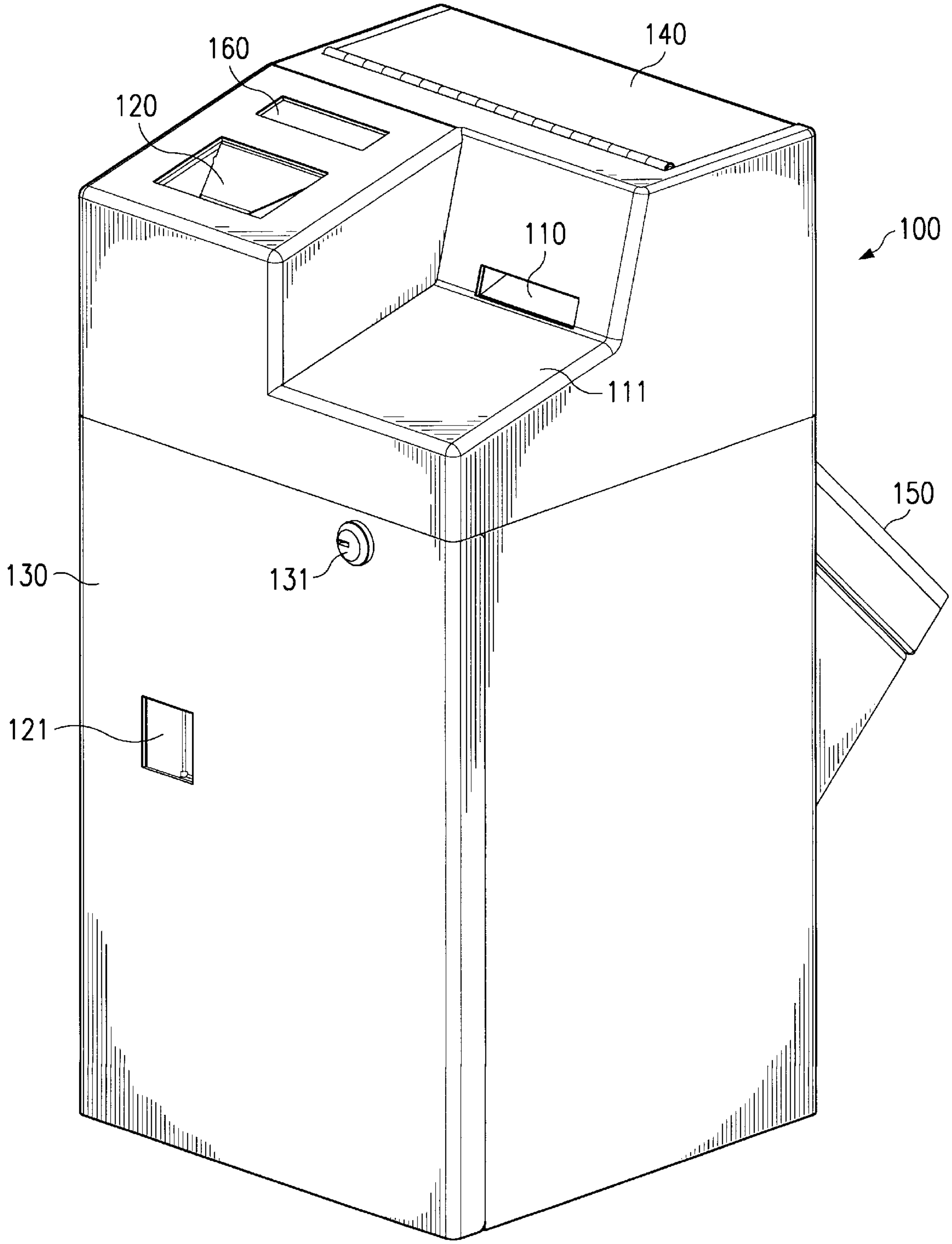
FIG. 1 illustrates a preferred embodiment of a transaction station according to the present invention in an isometric view from the front showing the front and right sides of a farebox.

Directing attention to FIG. 1, a preferred embodiment of a transaction station according to the present invention is illustrated in an isometric view from the front showing the front and right sides of a transaction station. The illustrated embodiment of the transaction station is farebox 100 as might be deployed in vehicles, such as city busses, for the collection of passenger fares.

Farebox 100 includes note chute 110 for acceptance of single notes or bills into farebox 100. Preferably, note chute 110 is disposed behind note receiving surface 111 to provide easy insertion of notes by patrons. It shall be appreciated that the terms notes and bills as used herein are intended to include currency such as bank or treasury notes, drafts, dollar bills, and the like.

Farebox 100 also includes coin chute 120 to provide easy insertion of a plurality of coins substantially simultaneously into farebox 100. Preferably coin chute 120 is adapted to readily accept a plurality of coins and direct the coins toward the coin system of farebox 100 without allowing certain undesired objects to pass. For example, in a preferred embodiment, coin chute 120 is conically shaped to present a larger opening to receive coins and a smaller opening, preferably having a size slightly larger than the diameter of the largest acceptable coin, to direct the coins to the coin system of farebox 100.

Preferably farebox 100 includes patron display 160 which may be any suitable display device including multiple line vacuum florescent display, a liquid crystal display (LCD), a gas plasma display, or even a cathode ray tube (CRT). Patron display 160 is disposed on a surface of farebox 100 in order to present information to patrons using farebox 100. For example, upon insertion of coins or notes into farebox 100, patron display 160 may display a total of the monies validated. Additionally, patron display 160 may provide other information such as instructions, greetings, or even advertisements. When coins or notes tendered by a patron are rejected by farebox 100 or when change is given in a transaction, where farebox 100 is adapted to distribute change, patron display 160 may provide a reminder message for the patron to collect this money.

In an alternative embodiment, farebox 100 may include a patron input device, such as a patron keypad (not shown), coupled to patron display 160. Accordingly, a patron may input information with respect to the transaction being conducted, such as through prompting by patron display 160. For example, upon insertion of monies sufficient for a plurality of fares available through farebox 100, patron display 160 may request that a patron select a particular fare through striking a particular key of the patron keypad. However, in the preferred embodiment, as discussed hereinbelow, selection of a proper fare is accomplished by input of an operator of farebox 100, such as through operator control unit (OCU) 150, in order to ensure proper payment by patrons. It should be appreciated, however, that some circumstances into which the transaction station of the present invention is deployed may benefit from the use of patron input.

Farebox 100 preferably includes coin return 121 disposed to present rejected coins to patrons. Furthermore, where farebox 100 includes circuitry and hardware for dispensing change due a patron from a transaction, such as is well known in the art, coin return 121 may also present this change to patrons.

It shall be appreciated that although notes, in addition to coins, may be rejected by farebox 100, there is no separate note return in the preferred embodiment of farebox 100. This is because note validators in common use today simply reverse the movement of a rejected note in order to eject it through the same orifice into which it was initially received. Accordingly, in the preferred embodiment, note chute 110 also operates as a note return. Of course, where a note validator is utilized which provides a separate path for rejected notes, farebox 100 may include a separate note return or may couple a note return with coin return 121. Additionally, where farebox 100 includes the aforementioned circuitry and hardware for presenting a patron with change due from a transaction, a note return (not shown) may be provided to accommodate change due which includes notes.

Farebox 100 includes secure panel 130, having locking mechanism 131 coupled thereto, in order to provide secure access to monies accepted by farebox 100. Additionally, in the preferred embodiment of farebox 100, secure panel 130 provides secure access to the controller circuitry of farebox 100. Accordingly, not only is the money accepted by the farebox safe from unauthorized removal, but so too is the circuitry of the farebox secure from unauthorized tampering. Accordingly, a preferred embodiment of farebox 100 includes sensors disposed on or near the secure panel in order that the controller may determine its having been opened. This information may be utilized to prohibit further operation of the farebox and/or may be recorded for later use by a central authority.

In the preferred embodiment, locking mechanism 131 is a key tumbler allowing access beyond secure panel 130 only to those possessing the proper key. However, locking mechanism 131 may be any form of limited access device such as a combination lock or a key card system.

Additionally, access to the stored monies of farebox 100 may be granted electronically, such as upon successfully downloading transaction information or fare collection information stored in the controller of farebox 100. Accordingly, in a preferred embodiment of the present invention, locking mechanism 131 includes electronic unlocking circuitry in order to allow automated release of secure panel 130. This electronic circuitry may include an electronic solenoid, motor, or the like to release a locking bolt as is well known in the art. Accordingly, the key tumbler of locking mechanism 131 may be utilized as a manual override of the electronic unlocking mechanism.

Preferably farebox 100 includes access panel 140 to allow operator access to areas within farebox 100 other than the secure areas protected by secure panel 130. For example, in the preferred embodiment of farebox 100, access panel 140 allows an operator to access a portion of the coin and note systems of farebox 100 prior to the coins and notes being validated for acceptance and storage into the secure area of farebox 100. Accordingly, as will be shown with respect to FIGS. 3 and 4 below, an operator may extricate monies which are jammed, trapped, or miss-fed in farebox 100 where these anomalies occur in the feed paths prior to validation by farebox 100.

Figure 2:
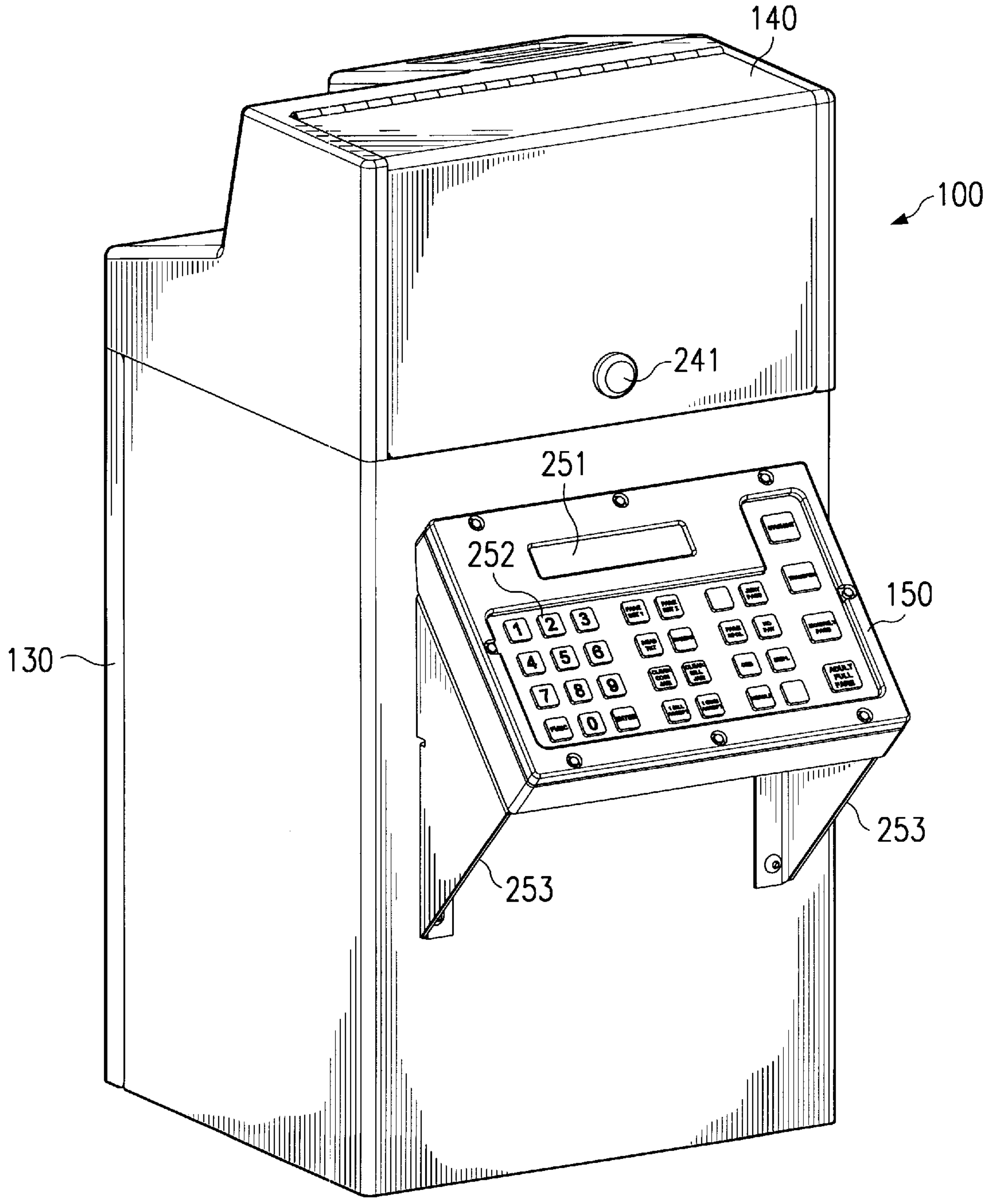
FIG. 2 illustrates the farebox of FIG. 1 in an isometric view from the back showing the back and right sides of the farebox.

Directing attention to FIG. 2, farebox 100 of FIG. 1 is illustrated in an isometric view from the back showing the back and right sides of farebox 100. Here OCU 150 is more clearly shown attached to farebox 100 through brackets 253. It shall be appreciated that OCU 150 may be disposed separate from farebox 100, if desired. For example, where farebox 100 is deployed in a city bus, OCU 150 may be disposed on an operator's panel in front of the bus driver and coupled to farebox 100 such as through signal cable, infrared transmission, radio frequency transmission, or the like. It shall be appreciated that useful separation of OCU 150 from farebox 100 may be had according to the present invention as the operator is not required to physically view monies accepted by farebox 100.

The preferred embodiment of OCU 150 shown includes operator display 251 which may be any suitable display device including a multi line vacuum fluorescent display, LCD, gas plasma display, or even a CRT. In the preferred embodiment, a vacuum fluorescent display is used because of temperature constraints. The controller of farebox 100 may present information to the operator through displaying messages on display 251. Such information may include instruction prompts, such as a request for operator identification, in order to log in an operator and place farebox 100 in an operating condition, or a request for a desired operating function of farebox 100. Likewise, operator display 251 may display transaction information, such as an amount of money tendered by a patron and accepted by farebox 100.

The preferred embodiment of OCU 150 also includes operator keypad 252. Accordingly, an operator may input information into the controller of farebox 100. Such information may include identification of the operator, in order to log in the operator and place farebox 100 in an operating condition, or a request for a desired operating function of farebox 100 or information stored in farebox 100.

Additionally, operator keypad 252 may provide for the operator inputting information with respect to a transaction being conducted. For example, upon tender of a fare by a patron, the tendered amount may be displayed on operator display 251 with a prompt for the operator to select a particular type of fare being purchased from a plurality of fares available for the amount tendered. The operator may input information with respect to the fare purchased by operation of operator keypad 252.

In the preferred embodiment keypad 252 includes programmable keys, such as soft keys, programmed by the controller of farebox 100. Accordingly, particular keys may be set aside for single keystroke entry of often input information, such as the aforementioned selection of a particular fare. Moreover, soft keys may be dynamically programmed by the controller of farebox 100 to correspond with a particular message or prompt being displayed on operator display 251. Accordingly, fewer keys of keypad 252 may be required in order to provide single, or expedited, key input of information.

Still referring to FIG. 2, access panel 140 is shown having locking mechanism 241 coupled thereto. Locking mechanism 241 provides controlled access to areas within farebox 100 which are not secured by secure panel 130 as described above. In a preferred embodiment, as the areas within farebox 100 to which access is provided by access panel 140 are not considered secure, locking mechanism 241 is a latch, such as a quarter turn finger bolt, to hold access panel 140 in a closed position. However, where more restricted access is desired, locking mechanism 241 may provided limited access, such as through the use of a key tumbler, combination lock, key card mechanism, or the like. A preferred embodiment of farebox 100 includes sensors disposed on or near access panel 140 in order that the controller may determine its having been opened. This information may be utilized to prohibit further operation of the farebox or its components. Furthermore, the information may be recorded for later use by a central authority.

Figure 3:
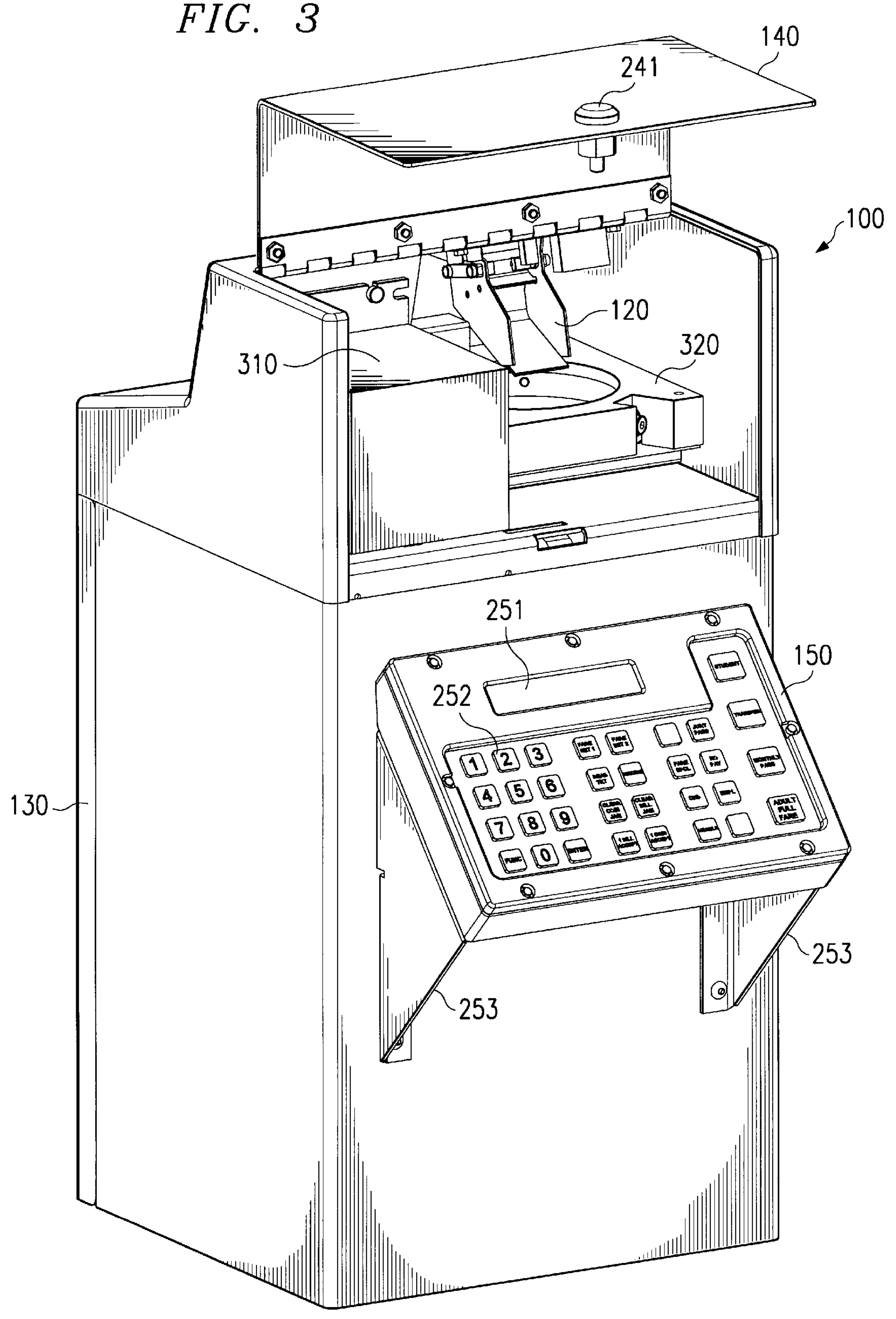
FIGS. 3 and 4 illustrate the farebox of FIG. 1 from the back having an access panel in an open position.
Figure 4:
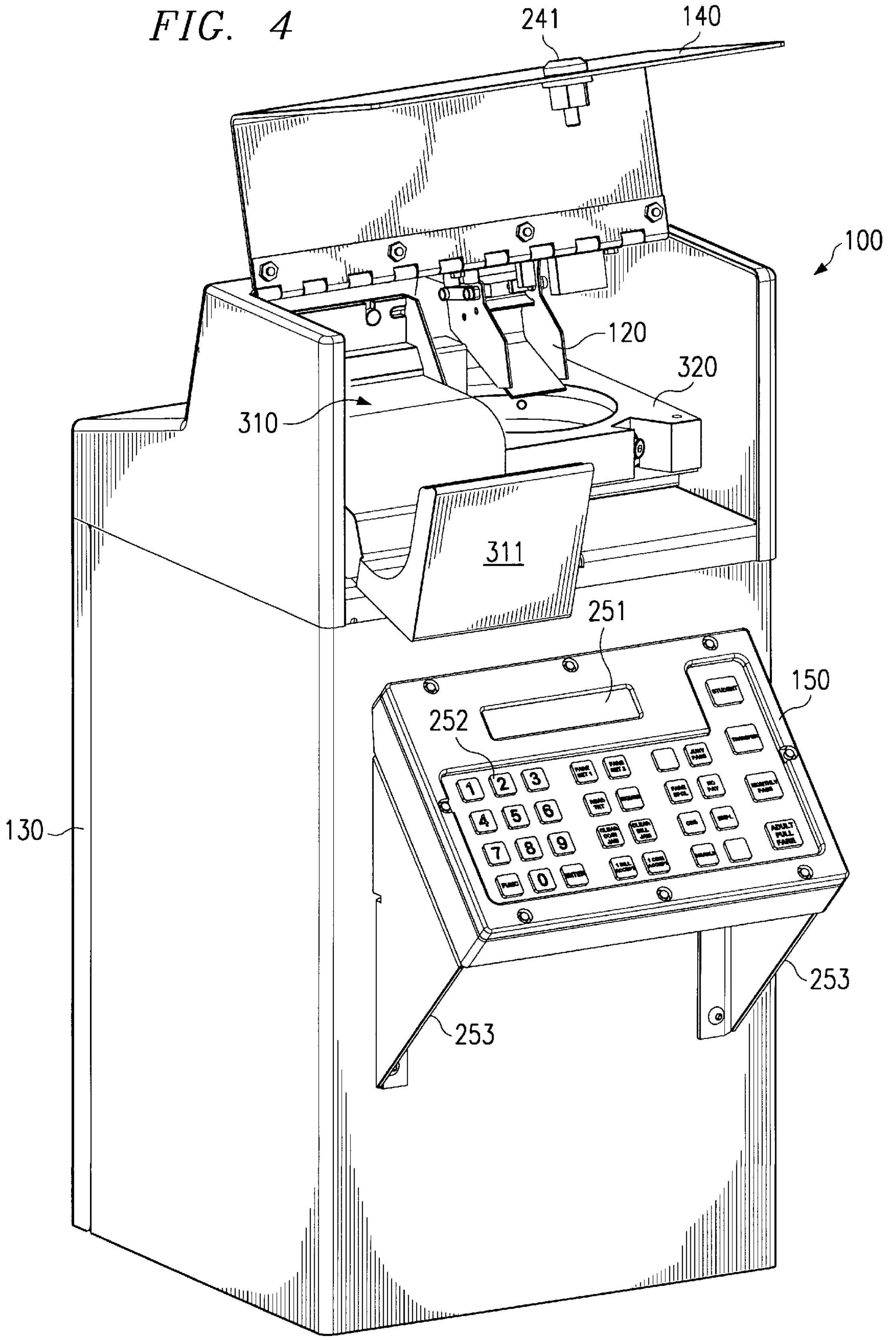

Directing attention to FIG. 3, farebox 100 of FIG. 1 is illustrated having access panel 140 in an open position. Accordingly, components of farebox 100 disposed in an area not secured by secure panel 130 are visible. These components include the underside of coin chute 120, coin singulator 320, and note validator 310.

As it is desired to conduct a transaction with a patron as rapidly as possible, farebox 100 is preferably adapted to receive coinage from patrons in bulk. For example, when disposed in a city bus, patrons may deposit a hand full of different denomination coins, representing all or a portion of a desired fare, simultaneously in coin chute 120. Accordingly, the preferred embodiment of farebox 100 includes a coin singulator, such as that shown and described in the above referenced patent application entitled "System And Method For Coin Singulation," in order to provide the coins to a coin validator of farebox 100 for validation, acceptance, and secure storage.

In a preferred embodiment of farebox 100, coin validation is accomplished electronically as the singulated coins are in free fall in order to provide validation rapidly and with a decreased likelihood of coins becoming jammed, trapped, or miss-fed. Accordingly, a preferred embodiment of farebox 100 utilizes Multi-Coin Validator part number 54-3000-10 available from Coin Controls, Inc., Elk Grove Village, Ill.

The preferred coin validator determines the denomination of coins by means other than solely relying on the diameter of the coin. For example, the Multi-Coin Validator identified above operates to both measure the coin as well as to determine attributes of the coin through variations in an electronic field. Accordingly, farebox 100 is able to reliably validate coins without operator input.

Patrons may introduce objects other than coins accepted by farebox 100 into the coin system of the farebox. For example, foreign coinage, washers, slugs, stones, etcetera may find their way into the coin system. Likewise, badly damaged coins may be introduced. These objects may cause jams or miss-feeds of the coin system. Accordingly, access panel 140 allows the operator to access at least that portion of the coin system which is not secure, i.e., a portion of the coin system prior to validation and acceptance of the coins, in order to remove foreign objects and/or to clear jams and miss-feeds.

Likewise, notes introduced by patrons into farebox 100 may cause jams or miss-feeds of the note system. Accordingly, access panel 140 provides operator access to portions of the note system which are not secure, i.e., a portion of the note system prior to successful validation and acceptance of the notes, in order to remove unacceptable notes and foreign objects and/or to clear jams and miss-feeds.

In the preferred embodiment, the note validator utilized in farebox 100 provides access to the note feed path prior to validation and acceptance of the notes. Directing attention to FIG. 4, a preferred embodiment of note validator 310 includes panel 311 to provide access to the note feed path prior to validation and acceptance. Accordingly, access panel 140 provides access for an operator to remove notes jammed or miss-fed prior to their validation and acceptance into the secure area of farebox 100.

In a preferred embodiment of farebox 100, various denomination notes are accepted and their value automatically determined. Accordingly, in this embodiment note validator 310 is not only adapted to determine and accept legal tender, but also determines the denomination of the note. Moreover, as will be further described below, note validator 310 is preferably adapted to reject notes, although acceptable legal tender, not faced in a proper orientation, i.e., reject notes having the note face pointed downward rather than upward. A note validator allowing the above described operator access as well as validation of notes as legal tender and determination of their denomination utilized in a preferred embodiment of the present invention is Bill Validator part number AMZUSAPLUS available from CashCode Company Inc., Concord, Ontario, Canada.

It shall be appreciated that it is desirable not to permit operator access to the coin or note systems after validation and acceptance as these coins and notes have successfully been accounted for in the transaction, such as through recording in the controller of farebox 100, and thus their removal by an operator could cause discrepancies in accounted for monies.

In a preferred embodiment, note validator 310 is also adapted to validate certain notes which are not legal tender. Such notes may include passes or discount cards utilized by selected patrons. These passes or cards may be validated by note validator 310, appropriate information communicated to the controller, and then the pass or card returned to the patron through note chute 110. Alternatively, the pass or card may be retained within farebox 100, such as with other accepted notes or, by direction through an alternative note feed path, in a storage area specifically for such non-legal tender notes.

Alternatively, or additionally, farebox 100 may include additional circuitry and hardware to read, or otherwise obtain information from, items other than accepted notes. For example, farebox 100 may include a magnetic card swipe slot (not shown) coupled to the controller to obtain information regarding a pass or discount card. Such a slot may also be utilized for accepting credit and/or debit cards in addition to the monies described above. Of course, note validator 310 may be adapted to read such information in addition to validating notes, if desired.

Figure 5:
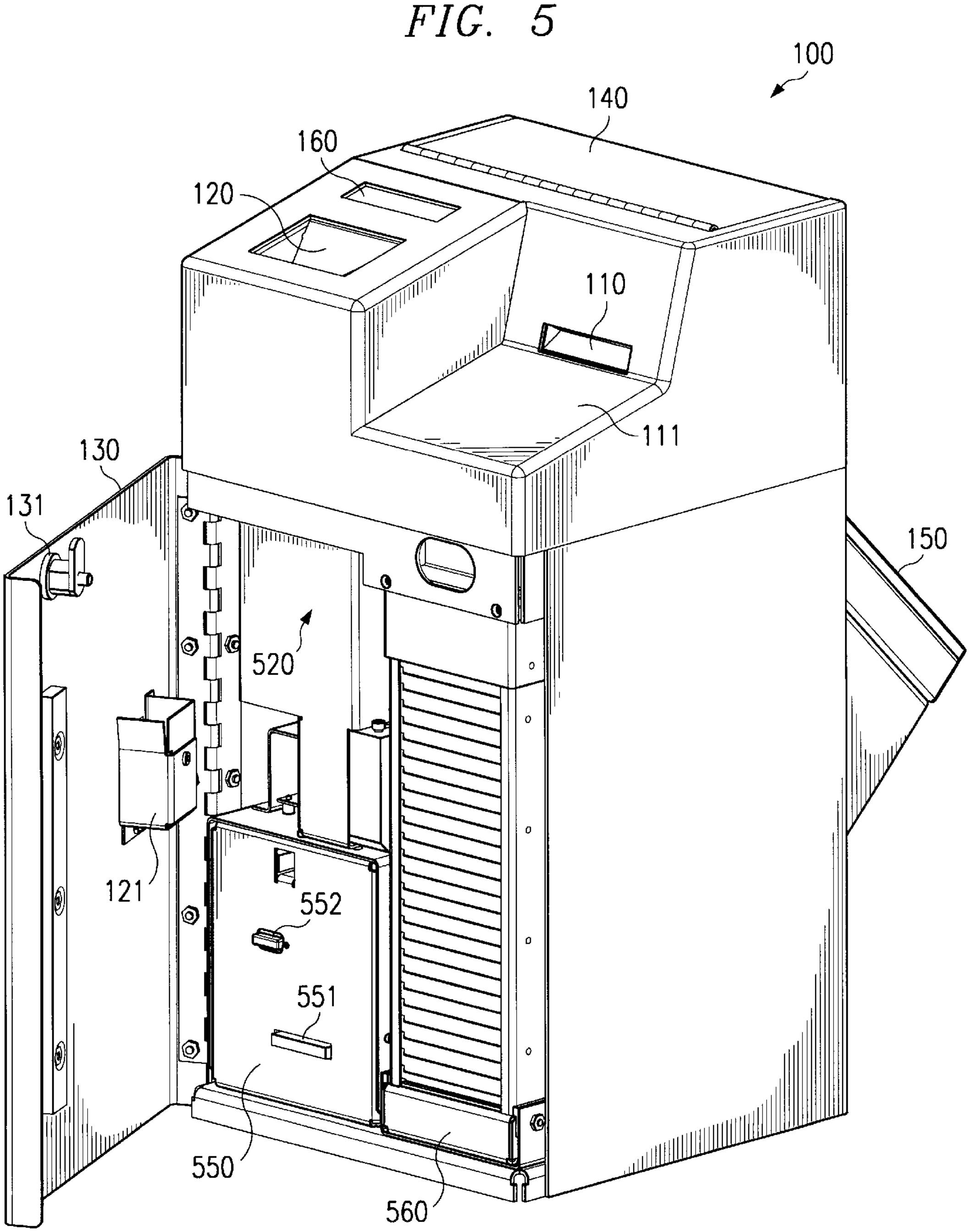
FIG. 5 illustrates the farebox of FIG. 1 from the front having a secure panel in an open position.

Directing attention to FIG. 5, farebox 100 of FIG. 1 is again illustrated from the front showing the front and right sides of farebox 100. However, in FIG. 5 secure panel 130 is in an open position to expose components of farebox 100 within the secure area. Accordingly coin system 520 is shown which preferably includes the aforementioned coin validator adapted to receive coins from coin chute 120 as singulated by coin singulator 320. Coin system 520 is adapted to discharge rejected coins through coin return 121 and to deposit accepted coins into cashbox 560, which in a preferred embodiment is a removable cashbox as shown and described in the above referenced patent application entitled "Configurable Cashbox."

Cashbox 560, in addition to receiving and storing coins from coin system 520, is also adapted to receive and store notes accepted by note acceptor 310. In a preferred embodiment cashbox 560 stores received notes in a tightly compressed bundle, where all notes are faced a same direction, in order to more efficiently store a large number of bills as well as to allow for automated counting and separation of the notes when removed from cashbox 560. Accordingly, the note system of farebox 100 preferably includes a note handling mechanism which receives notes as accepted from note validator 310, taking advantage of their being rejected if faced incorrectly, and stacks them tightly within cashbox 560. Of course, the note handling system may be adapted to reverse the facing, or otherwise adjust the orientation of an accepted note, such as where note acceptor 310 does not provide such a feature. The note handling system of the preferred embodiment will be discussed in further detail with respect to FIGS. 7–11 hereinbelow.

Also shown in FIG. 5 is controller 550 having interface connector 552 and bus connector 551 disposed thereon. Interface connector 552 and bus connector 551 may be utilized to couple devices to controller 550 such as external monitors, keyboards, disk drives, other processor based systems, and the like in order to provide functions such as uploading and downloading data, including a control program, as well as for diagnostic and testing purposes.

In the preferred embodiment controller 550 includes a central processing unit (CPU), memory (RAM), and an instruction set for providing desired operation of farebox 100, including the desired interaction of the components of farebox 100 as well as intelligent interaction with patrons and/or an operator. Preferably controller 550 is a general purpose processor based system, such as an open system operating under control of an INTEL 80X86 processor. One such system adapted for mounting within farebox 100 is PCM-SX CPU (PC/104) Module part number PCM-SX-33-2N available from WinSystems, Inc., Arlington, Tex. In order to interface such a general purpose processor based system with the components of farebox 100, the preferred embodiment of the present invention includes an interface adaptor such as that shown and described with respect to FIGS. 12–14 below. The use of a general purpose system is desirable for the cost advantages in initial purchase and maintenance, as well as for ease in programming, such as through off the shelf programming tools and application programs, and repair due to their wide spread use.

Controller 550 is coupled to the coin validator of coin system 520 and note validator 310 to receive information with respect to monies received and accepted thereby. Controller 550 is also coupled to patron display 160 and OCU 150 to communicate information therebetween. Accordingly, monies received and validated by the coin validator of coin system 520 and note validator 310 may be tallied by controller 550 for display on patron display 160 and operator display 251. Likewise, as described above controller 550 may inquire, such as through a message displayed on operator display 251, as to a type of fare being purchased with the received and validated monies, request instruction regarding an under or over payment, or allow the operator to bypass rejection of damaged coins or notes by inputting their amounts manually.

In the preferred embodiment, controller 550 is adapted to determine the presence of cashbox 560 in order to disable money accepting operation and, thus, avoid depositing accepted monies into a cavity rather than the secure confines of cashbox 560. Accordingly, farebox 100 may provide multiple levels of security wherein an operator is trusted to operate the farebox in conducting a transaction, a garage technician is trusted to download transaction information from the farebox and remove a locked cashbox therefrom, and a money room technician is trusted to open the cashbox and actually remove the monies contained therein for reconciliation with the downloaded information and bank deposit.

In the preferred embodiment of the present invention, cashbox 560 includes unique identification information in a machine readable format. Accordingly, controller 550 is adapted to read the unique identification information and therefore store transaction information associated with identification of a particular cashbox into which the monies were securely stored.

Figure 6:
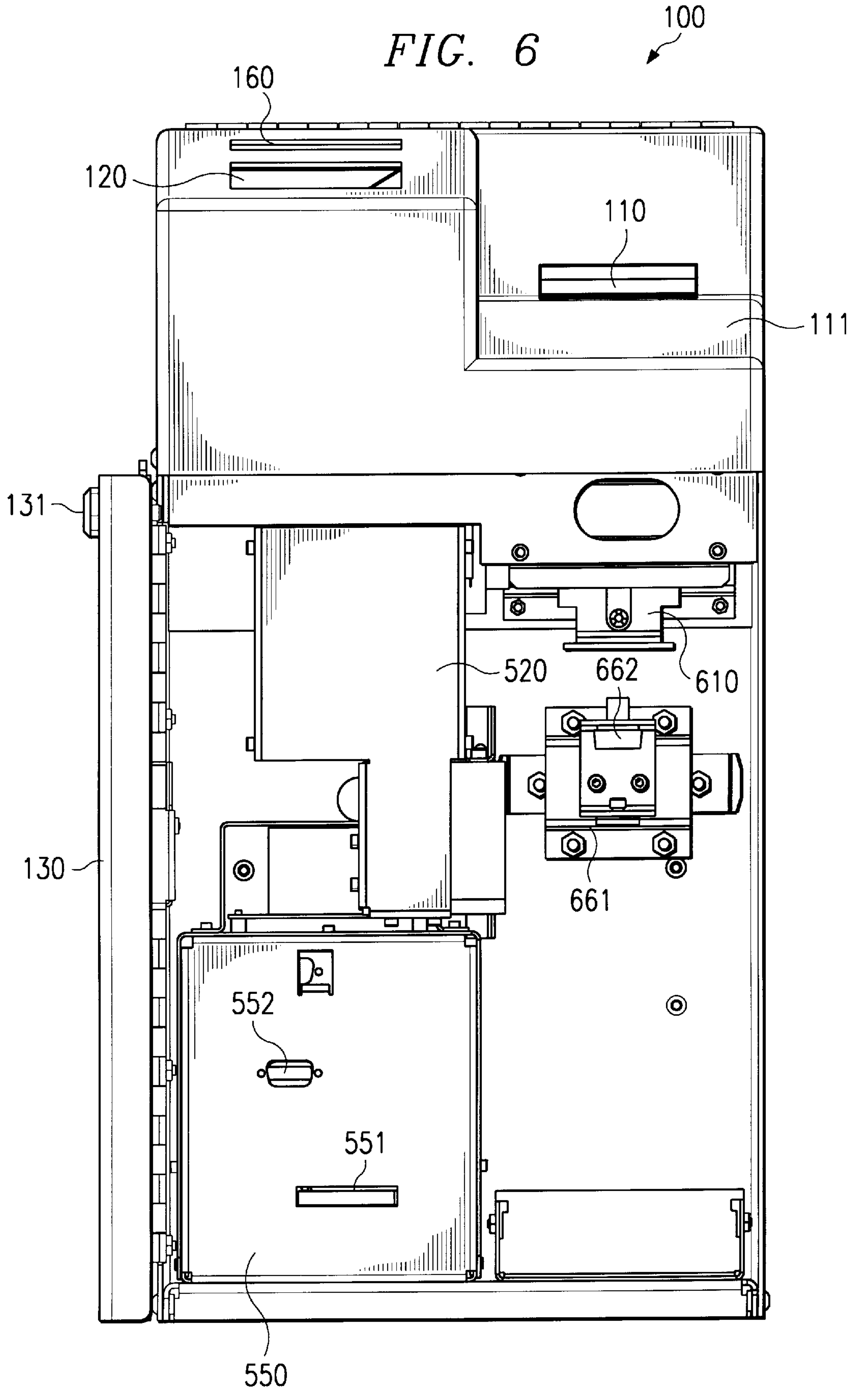
FIG. 6 illustrates the farebox of FIG. 1 in a front plan view having a secure panel in an open position.

Directing attention to FIG. 6, farebox 100 of FIG. 1 is shown in a front plan view having secure panel 130 in an open position and with cashbox 560 removed. Accordingly, latch 661, adapted to securely hold cashbox 560 within farebox 100 until the coin and note storage areas of cashbox 560 are closed and locked, is visible. Also visible is a portion of note stacker 610 which will be discussed in further detail with respect to FIGS. 7–11 hereinbelow.

Shown in FIG. 6 is receiver 662 which is coupled to controller 550. Receiver 662 is adapted to receive the machine readable unique identification information of cashbox 560 for provision to controller 550. Accordingly, controller 550 may not only determine if a cashbox has been installed in farebox 100 through information received from receiver 662, but may also uniquely identify the particular cashbox installed.

Controller 550 is also preferably coupled to sensors within farebox 100 in order to provide feedback as to its operational status, the condition of access panels, the condition of certain components, and the like. For example, in a preferred embodiment controller 550 is coupled to panel sensors (not shown) disposed to provide feedback with respect to operator panel 140 and secure panel 130 being opened. Accordingly, controller 550 may store this access information, along with other information such as the identification of an operator currently logged on, a current time, and a position of the host vehicle, for later use, such as in establishing an audit trail or determining statistical information with respect to particular service conditions. Additionally, controller 550 may disable certain functionality upon detection of a condition as determined from the sensors. For example, controller 550 may disable acceptance of monies when a sensor indicates secure panel 130 is in an open or unlocked position. Controller 550 may also display an appropriate message upon operator display 251 and/or patron display 160, if desired. Likewise, the status may be transmitted to a central authority, such as through a link between farebox 100 and a communication link such as the bus communication radio. Accordingly, a central authority may be able to dispatch service personnel automatically or, in the case where the secure panel is opened without authorization, dispatch police.

Controller 550 may also be coupled to sensors associated with the operation of various components of farebox 100. For example, coin singulator 320 may include sensors coupled to controller 550 to detect the presence of coins. Accordingly, operation of coin singulator may be instigated by controller 550 upon the detection of coins. The sensors associated with the components of farebox 100 may also detect a malfunction, such as a coin or note miss-feed or jam, and thus allow controller 550 to instruct an operator, such as through a message displayed on operator display 251, as to how to put farebox 100 back into service. Sensors of this sort are described in more detail below with respect to the note stacker of FIGS. 7–11.

Figure 7:
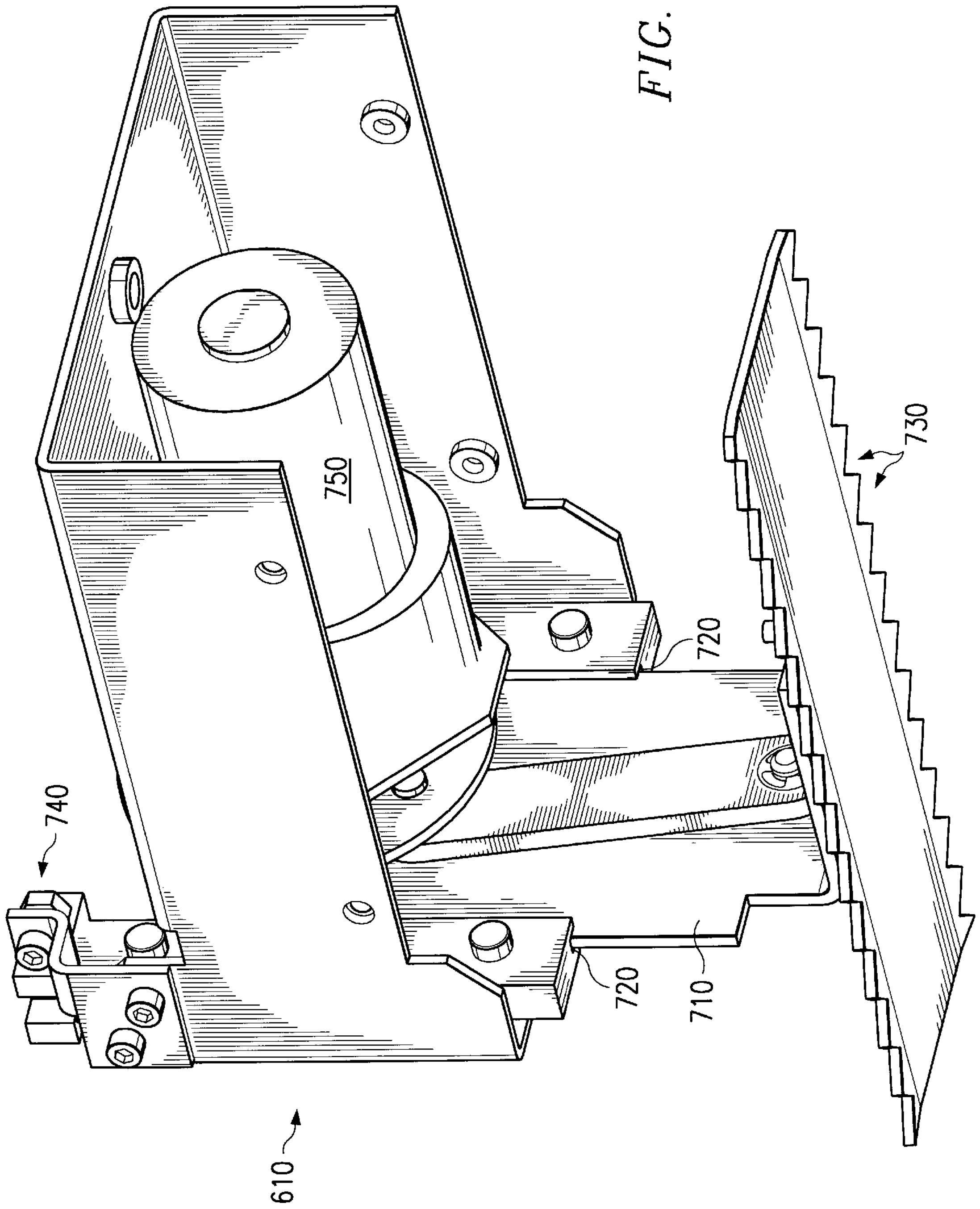
FIGS. 7 through 11 illustrate a preferred embodiment of the note stacker of the farebox of FIG. 1.

Directing attention to FIG. 7, note stacker 610 of a preferred embodiment is illustrated. Here stacker motor 750, preferably a high torque motor to provide sufficient power to compress a large number of notes, is shown in communication with plunger 710. Plunger 710 preferably is adapted to present gripping friction when engaging notes to be stacked in order to provide control over the notes when transitioning from the note feed path to storage within the cashbox. In the preferred embodiment, plunger 710 is adapted with slightly downwardly turned teeth 730 to provide gripping friction. However, it shall be appreciated that such gripping friction may be provided in a number of ways including vacuum, static electricity, or application of coating of a substance having a high coefficient of friction such as a rubber based product or a tacky substance.

In operation, motor 750 causes plunger 710 to travel from a home (or parked) position, where notes may be received in a note feed path, through a plunging cycle, as guided by slots 720, to transfer a note to a storage area. Where the storage area is adapted to retain received notes in a biased stack, such as shown and described in the above referenced patent application entitled "Configurable Cashbox," plunger 710 will also operate to tightly compress the stored stack of notes.

Sensor 740, preferably an opto-electric sensor consisting of a light emitting diode and photo diode pair, is disposed at the distal end of slot 720 in order to detect plunger 710 being in a home or parked position. Placement of sensor 740 with respect to slot 720 may be more clearly seen in FIG. 8. By coupling sensor 740 to controller 550, operation of motor 750 may be monitored to determine a full cycle of plunger 710. Additionally, once sufficient time has elapsed for motor 750 to cause plunger 710 to complete a cycle, controller 550 may detect a jam or other error condition through reference to sensor 740.

Figure 8:
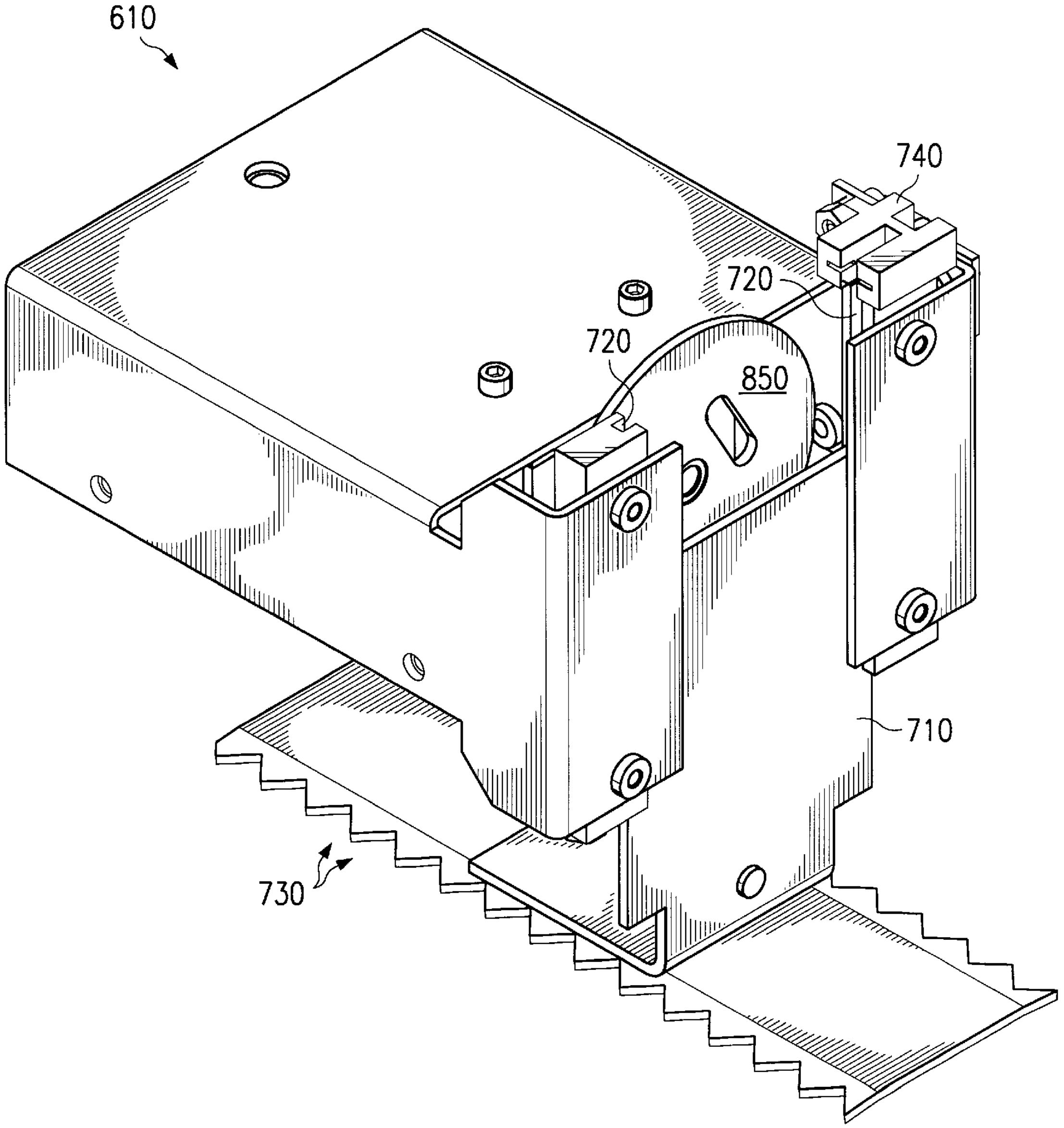
Figure 9:
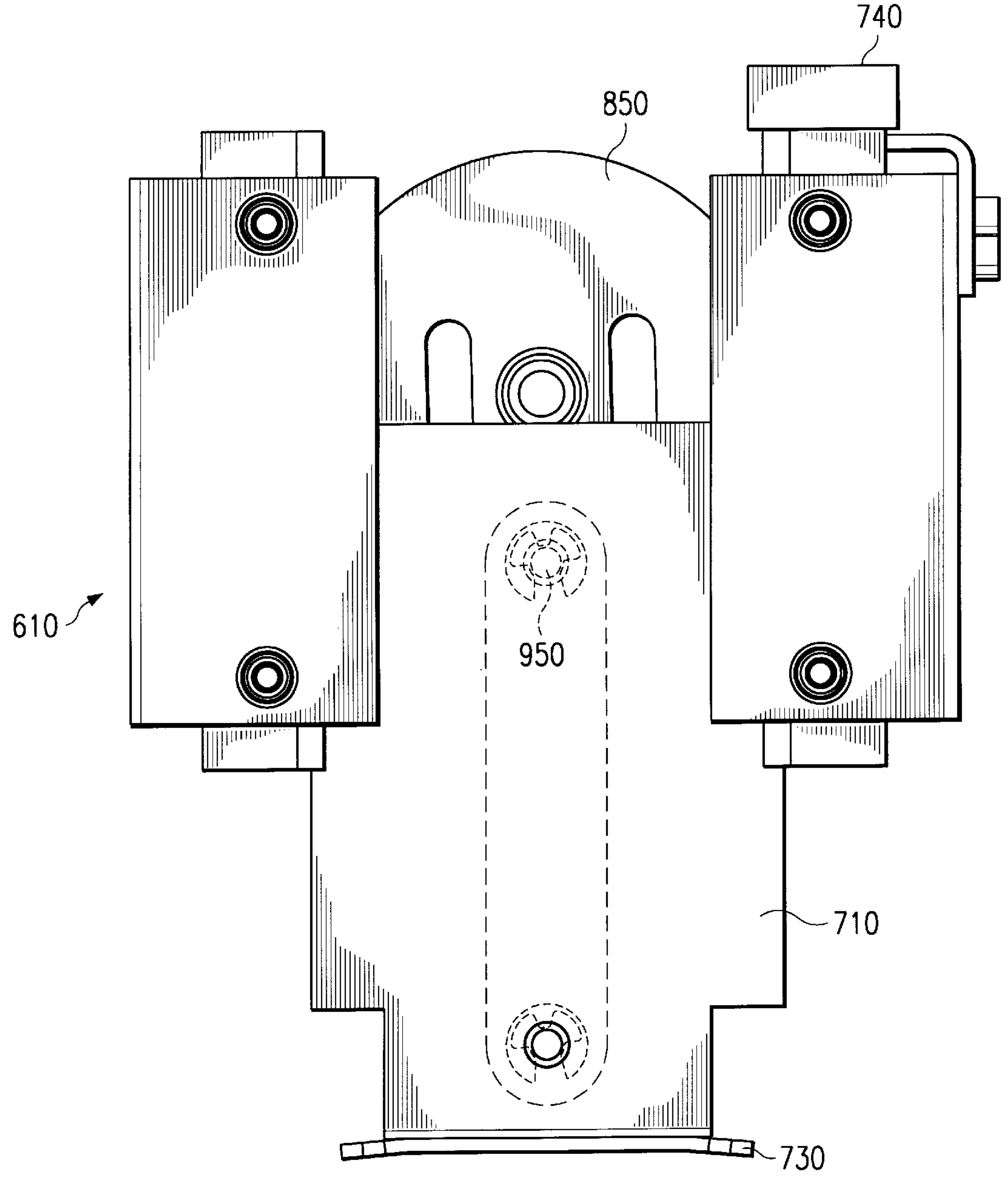

Also shown in FIG. 8 is wheel 850 coupled to motor 750. Wheel 850 is coupled to plunger 710 by an eccentric, shown in FIG. 9, to transform the rotational energy of motor 750 into the desired linear motion of plunger 710. Referring to FIG. 9, eccentric 950 of wheel 850 may be seen.

Figure 10:
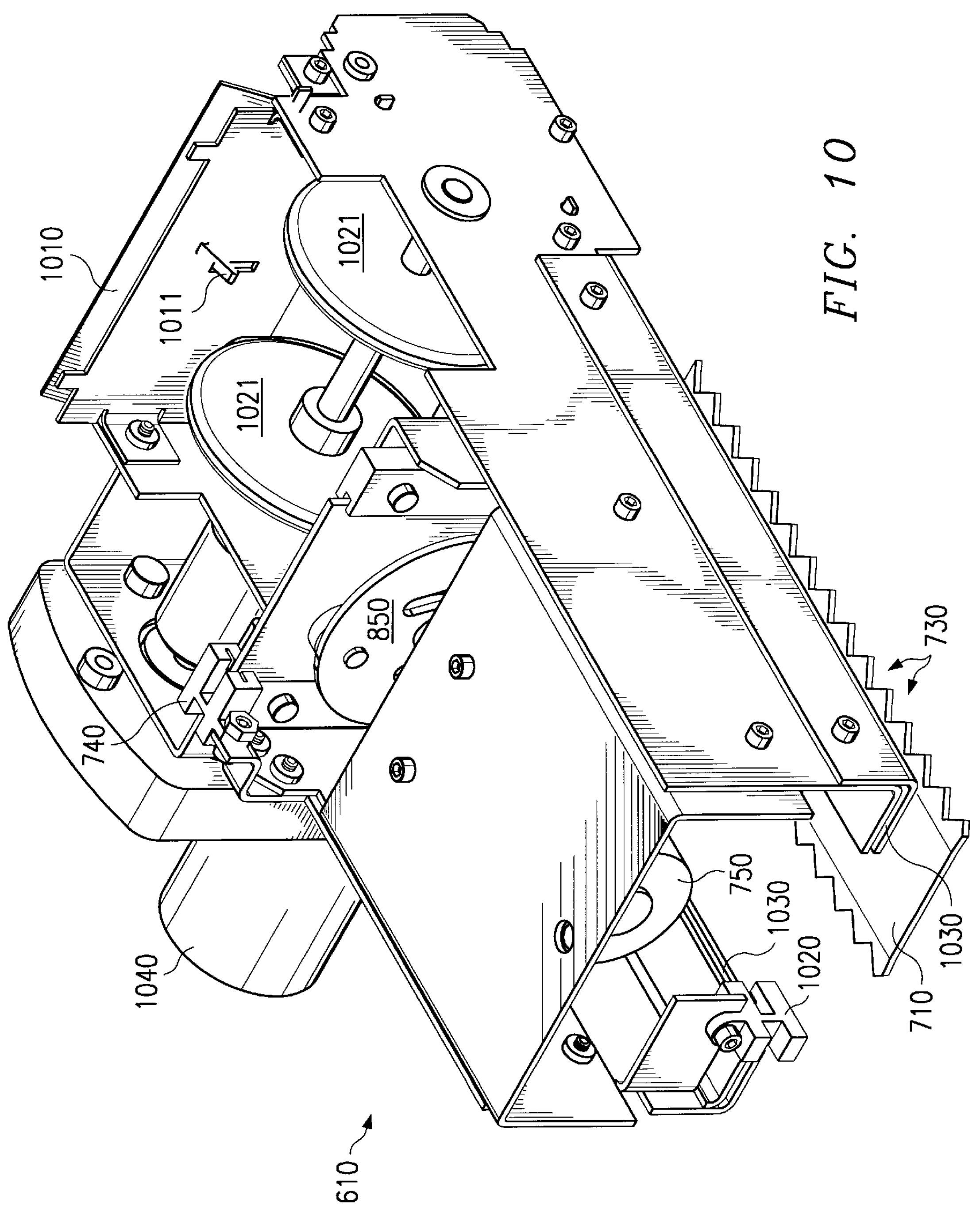
Figure 11:
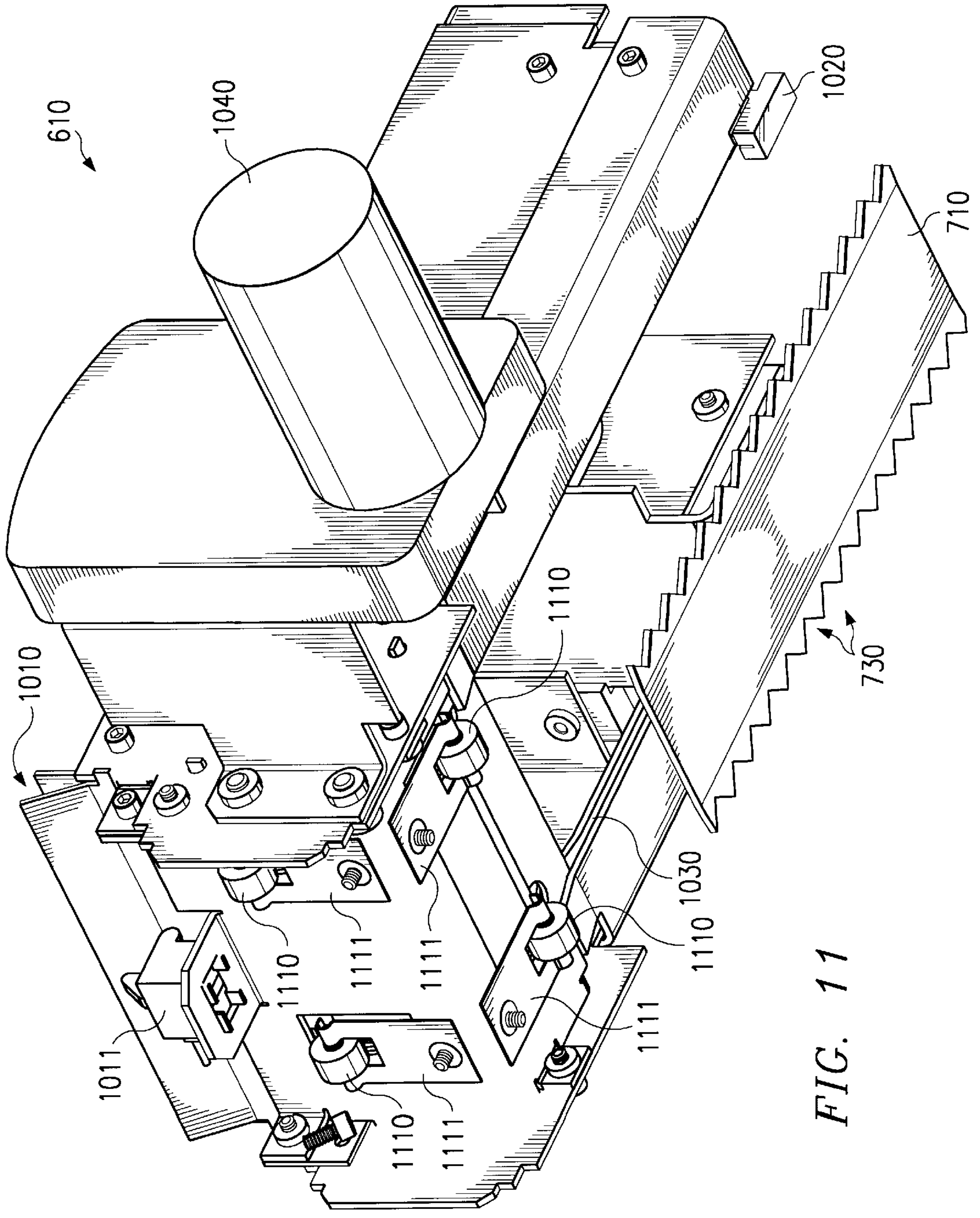

Directing attention to FIG. 10, note stacker 610 is illustrated having the note feed path coupled thereto. Accordingly, note receiving slot 1010 and note delivery slots 1030 are shown. Disposed near note receiving slot 1010 are note transfer wheels 1021 coupled to note transfer motor 1040.

In operation, when a note is accepted by note verifier 310, it is fed by note verifier 310 into note receiving slot 1010. Thereafter sensor 1011, preferably a flag switch, coupled to controller 550 detects the presence of the note and causes note transfer motor 1040 to energize and rotate note transfer wheels 1021. Note transfer wheels 1021 engage a top surface of the received note and transfer it from note verifier 310 to slots 1030 below plunger 710. Note transfer wheels 1021 are disposed to present the accepted note fully within slots 1030 when note transfer wheels 1021 disengage the surface of the accepted note, i.e., note transfer wheels 1021 have traversed the length of the accepted note.

Cycling of plunger 710 by controller 550 may be at a predetermined time after sensor 1011 initially detected the presence of the accepted note (leading edge of sensor input) or, alternatively, may be a predetermined time after sensor 1011 detects the passing of the accepted note (trailing edge of sensor input).

Additionally, sensor 1020, preferably an opto-electronic sensor consisting of a light emitting diode and photo diode pair, disposed at a distal end of slot 1030 may be utilized in cycling plunger 710. For example, sensor 1020 may provide information to controller 550 that a note has been fully received into slots 1030 and, therefore, cycling of plunger 710 is appropriate. However, as notes such as paper currency are expected to be presented in a well used condition, it is expected that acceptable notes may be somewhat irregular, such as having a missing or "dog eared" corner. Accordingly, sensor 1020 alone may not be a reliable method of providing control information to controller 550 with respect to plunger 710. Accordingly, an alternative embodiment of the present invention may include a second sensor disposed at the distal end of the other slot 1030 in order that notes having one corner missing may be detected.

However, in a preferred embodiment of the present invention, sensors 1011 and 1020 are used in combination by controller 550 for determining the condition of note stacker 610. For example, sensor 1011 may be principally relied upon by controller 550 to control operation of plunger 710. This may be desirable as sensor 1011 is disposed to detect the main portion of an accepted note, which if sufficiently missing will not likely be validated by note validator 310. Thereafter, operation of plunger 710 may be at a predetermined time from a condition detected by sensor 1011.

However, information from sensor 1020 may be utilized in determining an error condition. For example, when plunger 710 is cycled by controller 550 after the particular condition of sensor 1011, if sensor 1020 provides information that slots 1030 are not clear, controller 550 may determine that a jam or miss-feed has occurred. Likewise, if sensor 1011 repeatedly provides information that notes are being accepted but sensor 1020 does not detect their presence in slot 1030, controller 550 may determine that a jam or miss-feed has occurred. However, it shall be appreciated that this last determination should require a series of notes not detected by sensor 1020, as one note may be irregular, i.e., missing a corner, and not engage sensor 1020 although properly fed according to the present invention.

In order to transfer accepted notes from note validator 310 to slots 1030, note stacker 610 is adapted such that transfer wheels 1021 provide a nip to frictionally engage notes. Directing attention to FIG. 11, idlers 1110 are shown disposed in juxtaposition with the radial surface of transfer wheels 1021. Accordingly, bias springs 1111 cause idlers 1110 to engage transfer wheels 1021 and thereby provide a nip which causes transfer wheels 1021 to frictionally engage the surface of a note received into receiving slot 1010.

In the preferred embodiment, the force at which idlers 1111 are biased toward transfer wheels 1021 is selected to be within a predetermined range. Selection of this bias force is important where note validator 310, such as that of the preferred embodiment, feeds a received note past sensors to determine its validity and/or denomination and, therefore, feeds the note, at least partially, into receiving slot 1010. In this embodiment, if the note is rejected by validator 310, the friction between transfer wheels 1021 and the note must be sufficiently small to allow note validator to reverse the path of the note for rejection out note chute 110. However, the friction between transfer wheels 1021 and the note must be sufficiently large to allow the note to be fed fully into slots 1030 when the note fully disengages note validator 310.

Additionally, as rejection of a note in such a manner results in tripping of sensor 1011, the preferred embodiment of farebox 100 includes information communication from validator 310 to controller 550 in order to avoid an improper error condition which might be caused when sensor 1020 does not detect the rejected note. Moreover, such sensory input by note validator 310 may be utilized by controller 550 to detect tampering, such as by repeated insertions of counterfeit notes, or for use in adjusting the sensitivity of note validator 310.

Having described the physical configuration of a preferred embodiment of the present invention, a description of the electrical interconnection of components of a preferred embodiment of farebox 100 will now be given. Directing attention to FIGS. 12A through 12C, a block diagram illustrating the electrical interconnection of the major components of farebox 100 is shown.

Figure 12A:
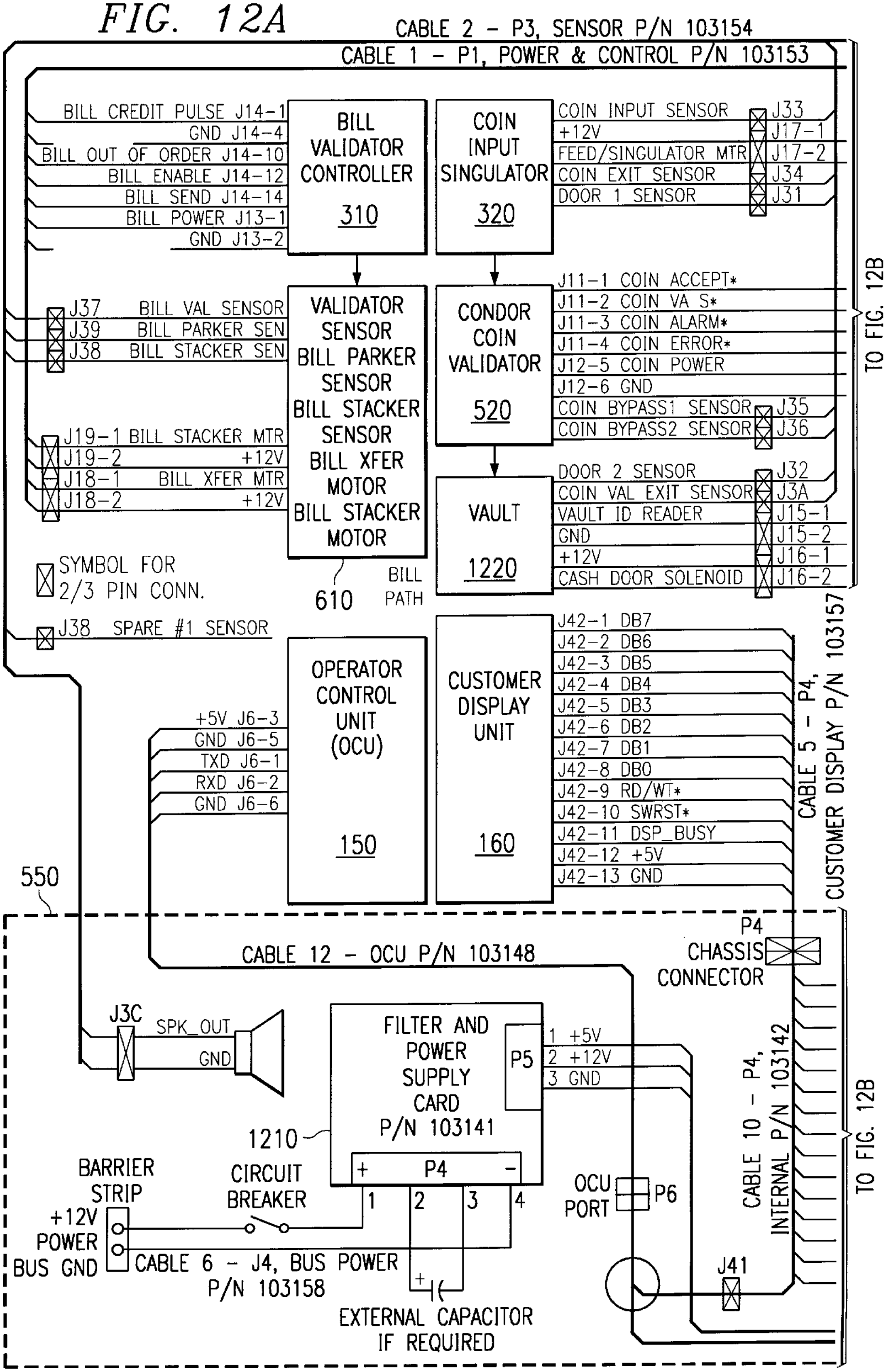
FIGS. 12A through 12C illustrate a block diagram of the electrical interconnection of the major components of the farebox of FIG. 1.
Figure 12B:
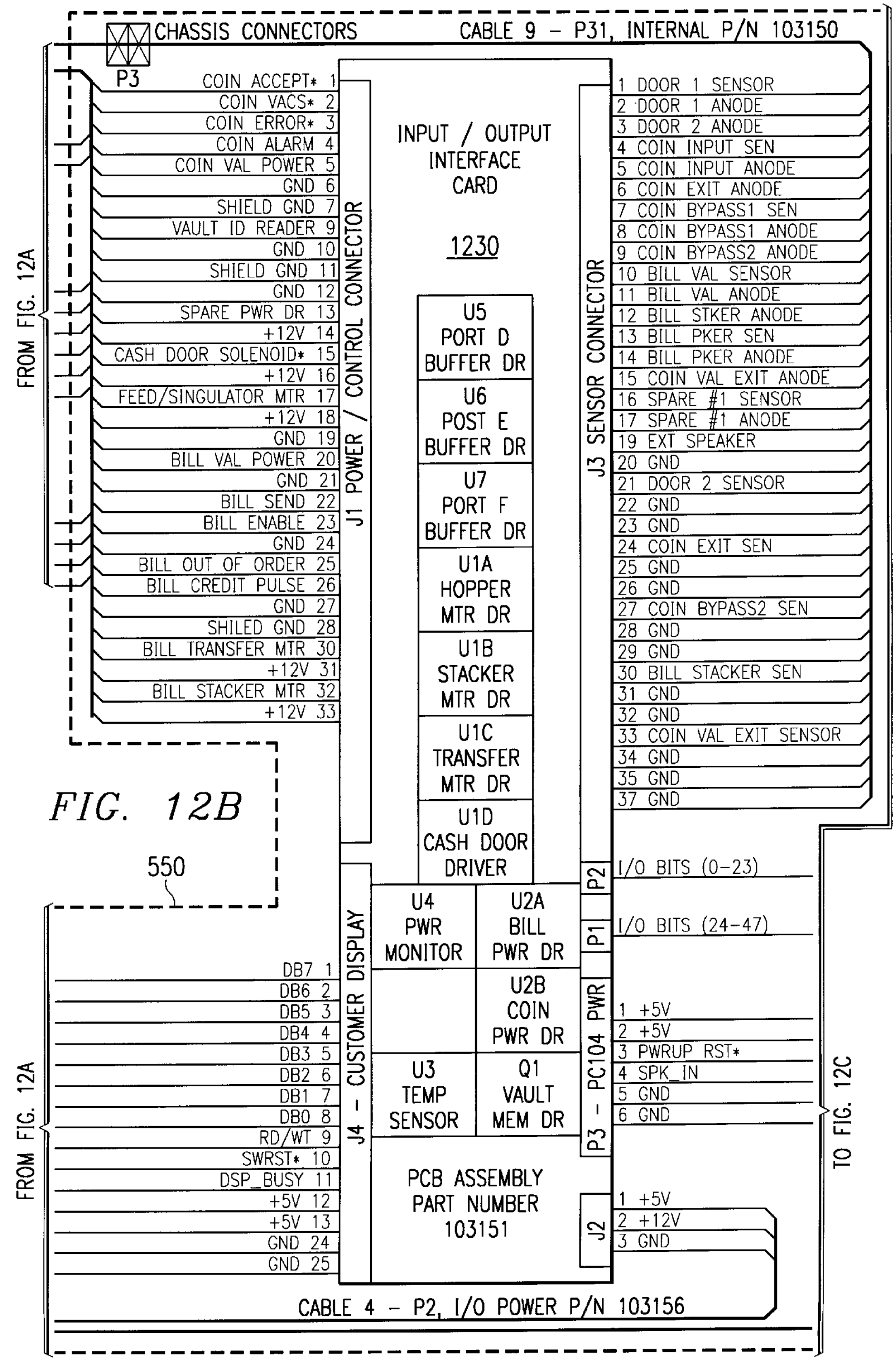
Figure 12C:
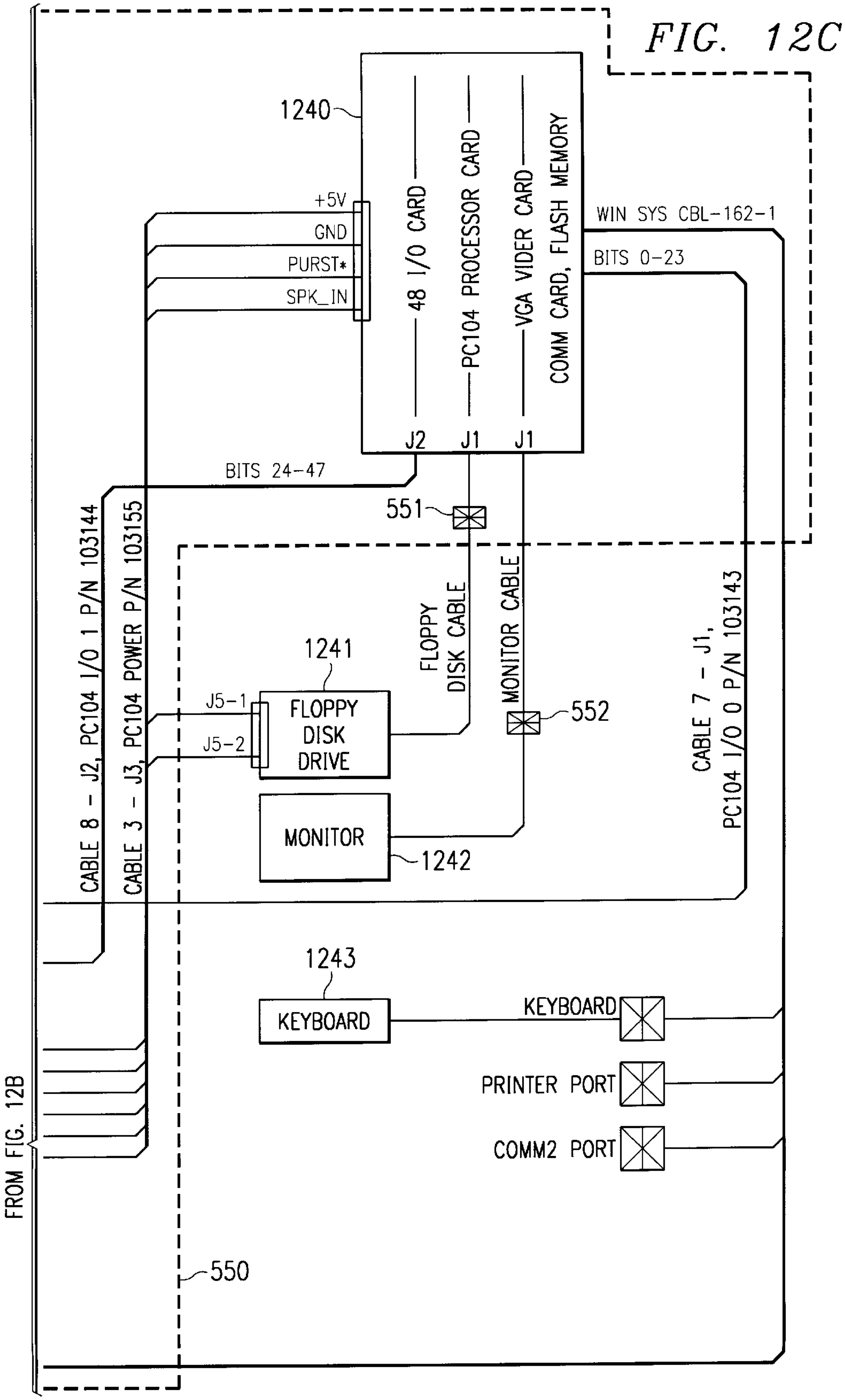

Shown in FIGS. 12A through 12C is the aforementioned controller 550 coupled to note validator 310, note stacker 610, coin singulator 320, coin system 520, OCU 150, and patron display 160. Also shown in FIGS. 12A through 12C is coupling of the aforementioned controller 550 to secure storage area 1220.

Figure 19:
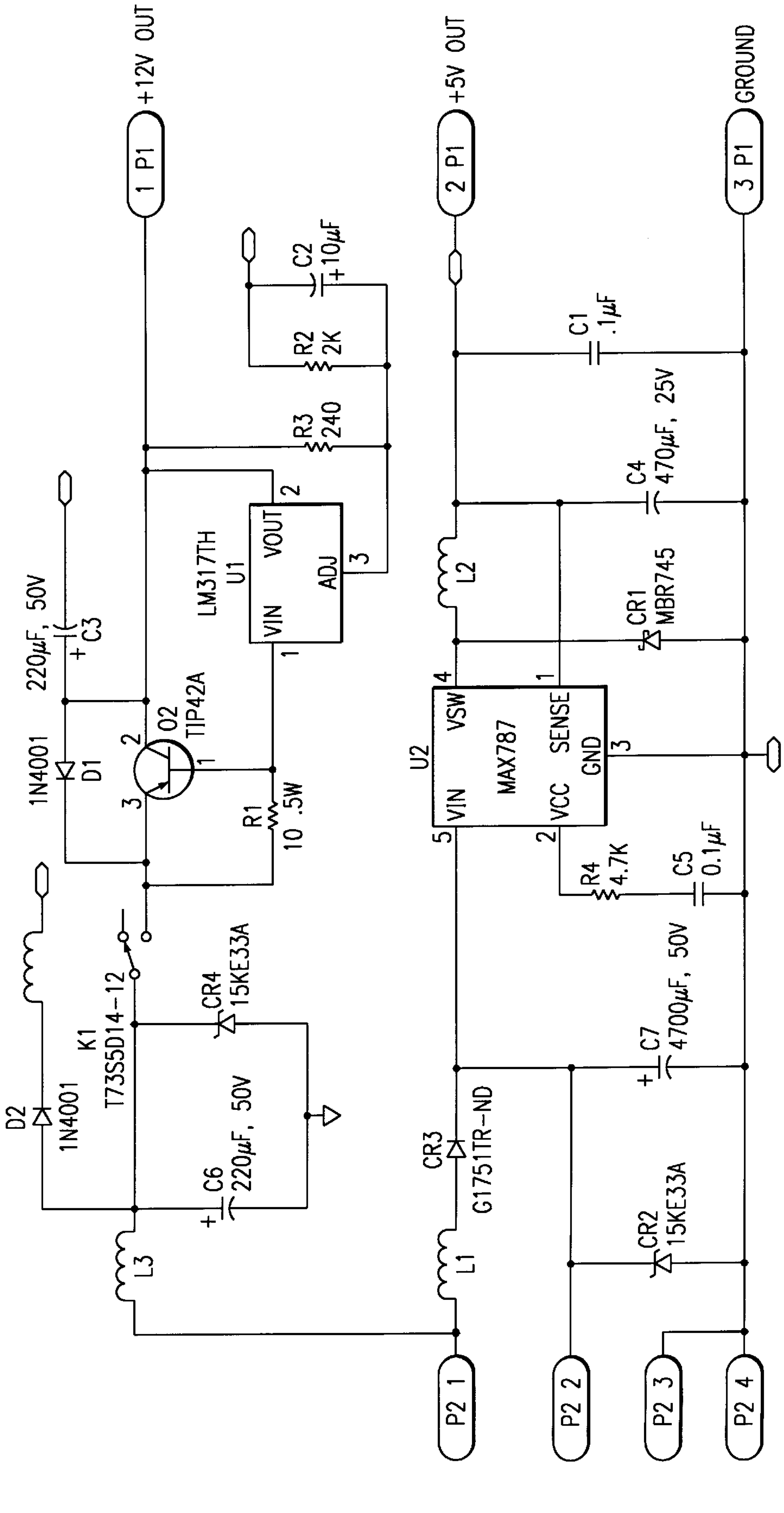
FIG. 19 illustrates a schematic diagram of a preferred embodiment of a power supply adapted for use with vehicular power source.

As shown in FIGS. 12A through 12C, controller 550 includes filter and power supply 1210 providing the power couplings necessary to operate farebox 100. In the preferred embodiment farebox 100 utilizes a power supply developer to work with standard vehicular power and to overcome the problems associated with this source of power. Directing attention to FIG. 19, a schematic diagram of the preferred embodiment of the power supply is shown. However, as the preferred embodiment of farebox 100 utilizes voltages common to most open general purpose processor based systems. An alternative embodiment may utilize a switching power supply commonly available and well known in the art.

Controller 550 includes general purpose processor based system 1240 which, as discussed above, is preferably PCM-SX CPU (PC/104) Module part number PCM-SX-33-2N available from Winsystems, Inc., Arlington, Tex. However, in order to provide interfacing with other components of farebox 100, the preferred embodiment of the present invention includes interface adaptor 1230 which will be discussed in greater detail with respect to FIGS. 13 and 14 hereinbelow.

Shown coupled to processor based system 1240 are floppy disk drive 1241, monitor 1242, and keyboard 1243. These devices are not required for the operation of farebox 100, however they may be coupled thereto, such as through interface connector 552, bus connector 551, or other suitable interface of controller 550, and utilized in programming, trouble shooting, and maintaining farebox 100 and are therefore illustrated for completeness.

As shown, interface adaptor 1230 provides information communication between note validator 310 and controller 550, including connection for credit pulse, out of order, enable, and send. Likewise, interface adaptor 1230 provides information communication between coin system 520 and controller 550, including coin accepted, alarm, and error sensors. Additionally, the required power connections are provided for these components.

Additionally, interface adaptor 1230 couples note stacker 610 with controller 550. Accordingly, as described above, note transfer motor 1040 and motor 750 may be switchably energized, as well as errors and status detected, by controller 550 according to feed back received from sensor 1011 (validator sensor), sensor 740 (parker sensor), and sensor 1020 (stacker sensor).

Similarly, interface adaptor 1230 couples coin singulator 320 with controller 550. Accordingly, as described above, the singulator (singulator motor) may be switchably energized, as well as errors and status detected, by controller 550 according to feed back received from a coin input sensor and a coin exit sensor.

Additionally, interface adaptor 1230 couples sensors within secure storage area 1220 with controller 550. Accordingly, controller 550 may detect the presence of a removable vault, its unique identification, as well as various error and status conditions through feed back from a secure door sensor, coin exit sensor, and receiver 662 (vault ID reader). Furthermore, electronic release of locking mechanism 131 may be provided by a door solenoid signal.

Also shown in FIGS. 12A through 12C is interconnection of OCU 150 and patron display 160. As shown, patron display 160 is preferably provided with a parallel data connection to controller 550. However, in order to provide for its positioning at a point removed from farebox 100, OCU 150 is preferably coupled to controller 550 through a serial interface which, in addition to requiring a reduced number of data lines for information communication, also allows for extended cable lengths, and even remote connection such as through a modem (not shown).

Although not shown, interface adaptor 1230 may also be adapted to provide interconnection of controller 550 with other electronic apparatus, such as a GPS, for positioning information, or a radio, for real time communication of information to a central office, or other electronics such as might be available in a "smart bus" or other host environment.

Figure 13A:
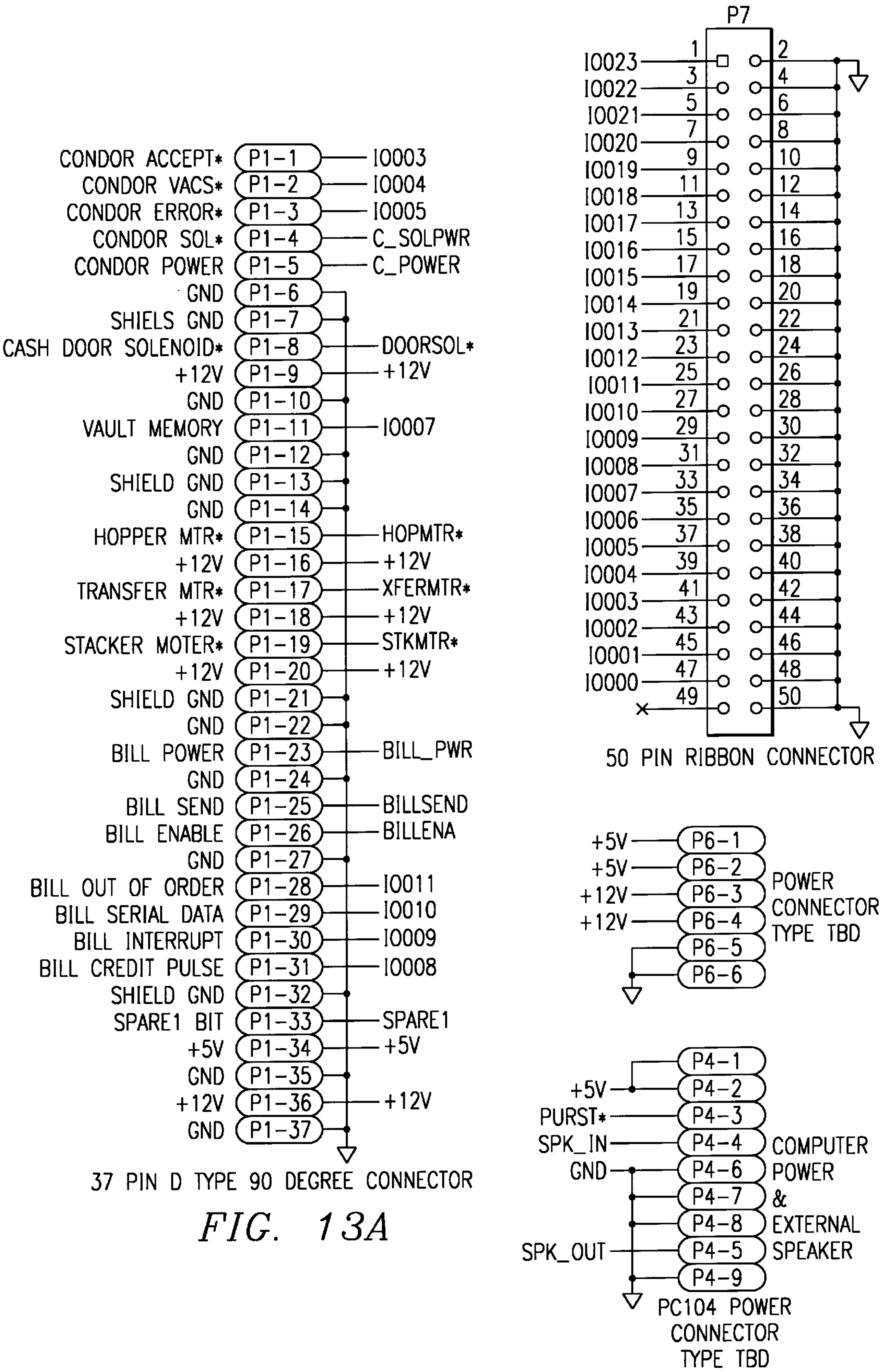
FIGS. 13A through 13B provide pin out information for the connectors of a preferred embodiment of the interface adaptor shown in FIGS. 12A through 12C.
Figure 13B:
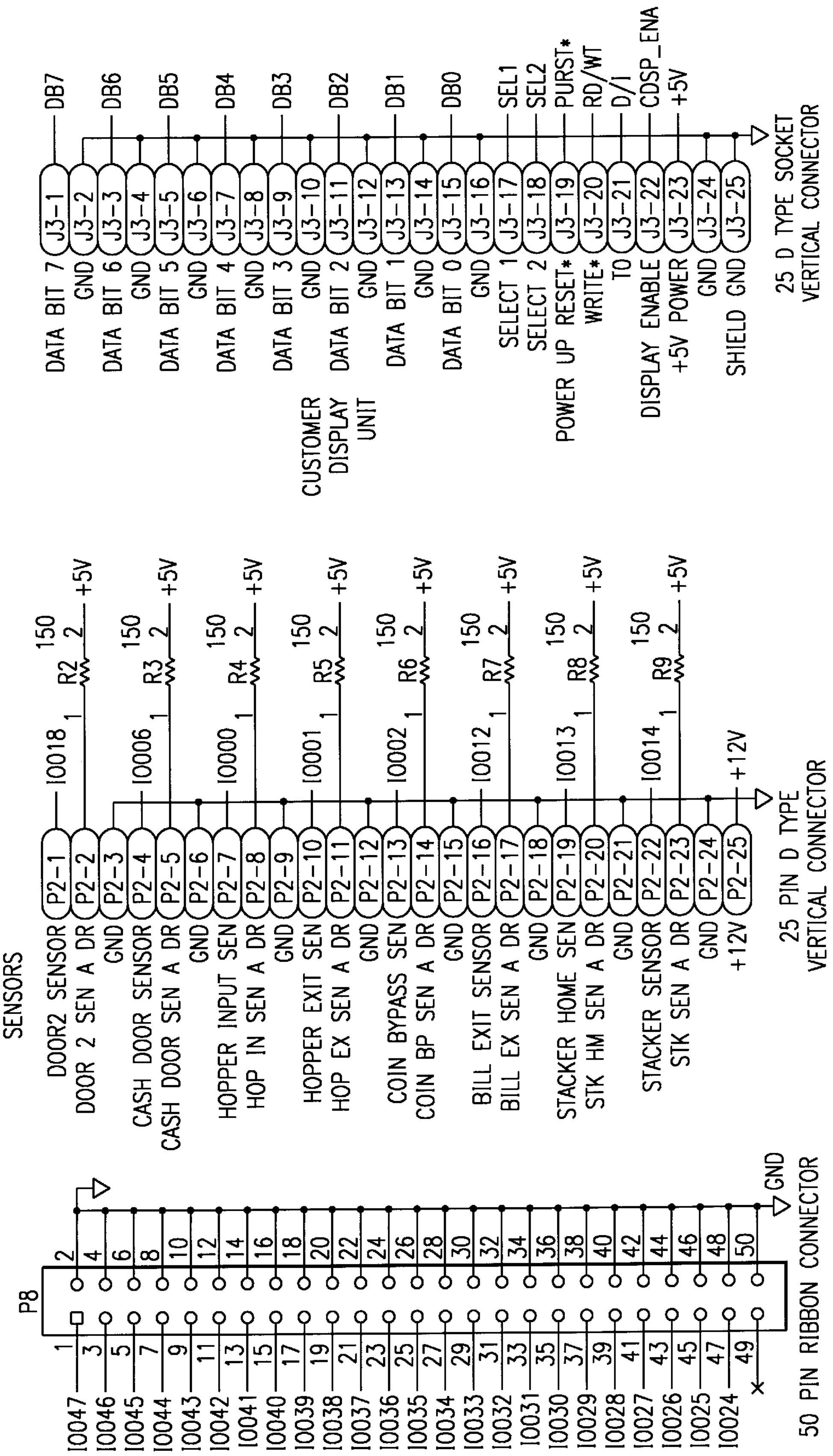
Figure 14A:
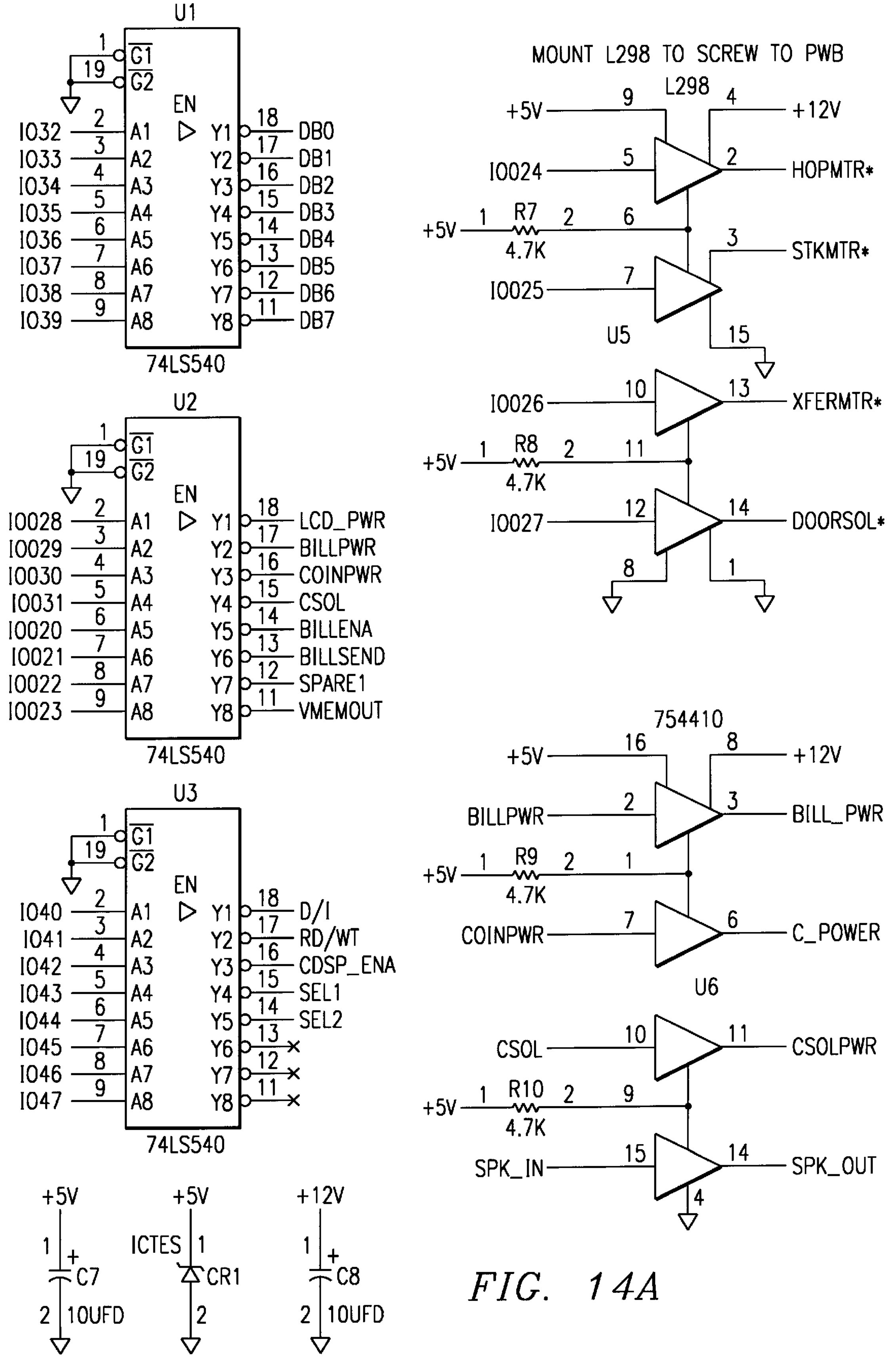
FIGS. 14A through 14B provide a schematic diagram of components of the interface adaptor shown in FIGS. 12A through 12C.
Figure 14B:
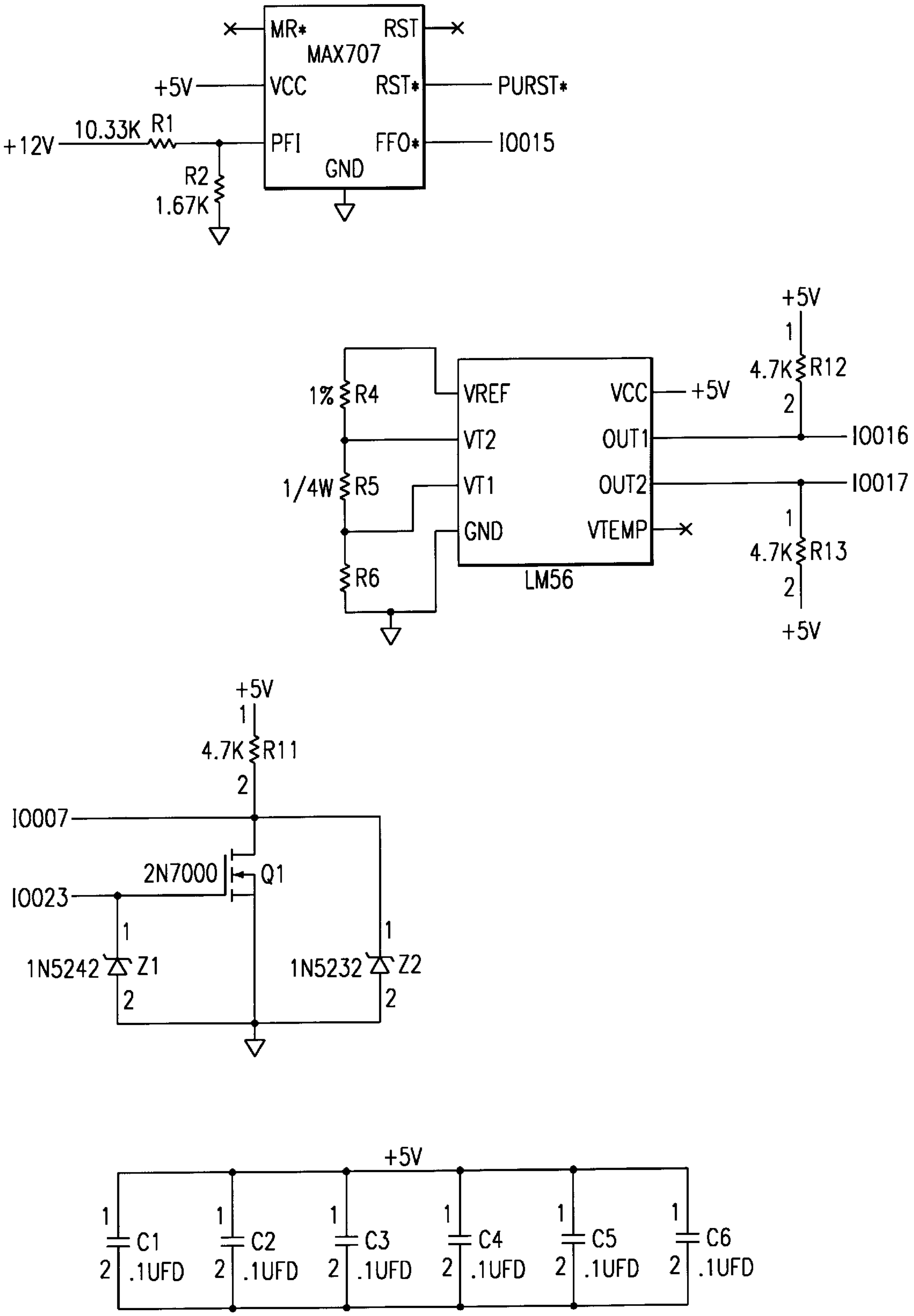

Directing attention to FIGS. 13A through 13B and 14A through 14B, further detail of interface adaptor 1230 is shown. FIGS. 13A through 13B provide pin out information for the connectors of a preferred embodiment of interface adaptor 1230. FIGS. 14A through 14B provides a schematic diagram of components of interface adaptor 1230.

Having described the electrical interconnection of components of the preferred embodiment of farebox 100, description of the operation of farebox 100 under control of the instruction set of controller 550 will now be given. FIGS. 15–18 provide flow diagrams of operation of farebox 100 under control of controller 550 according to a preferred embodiment of the controller instruction set.

Figure 15:
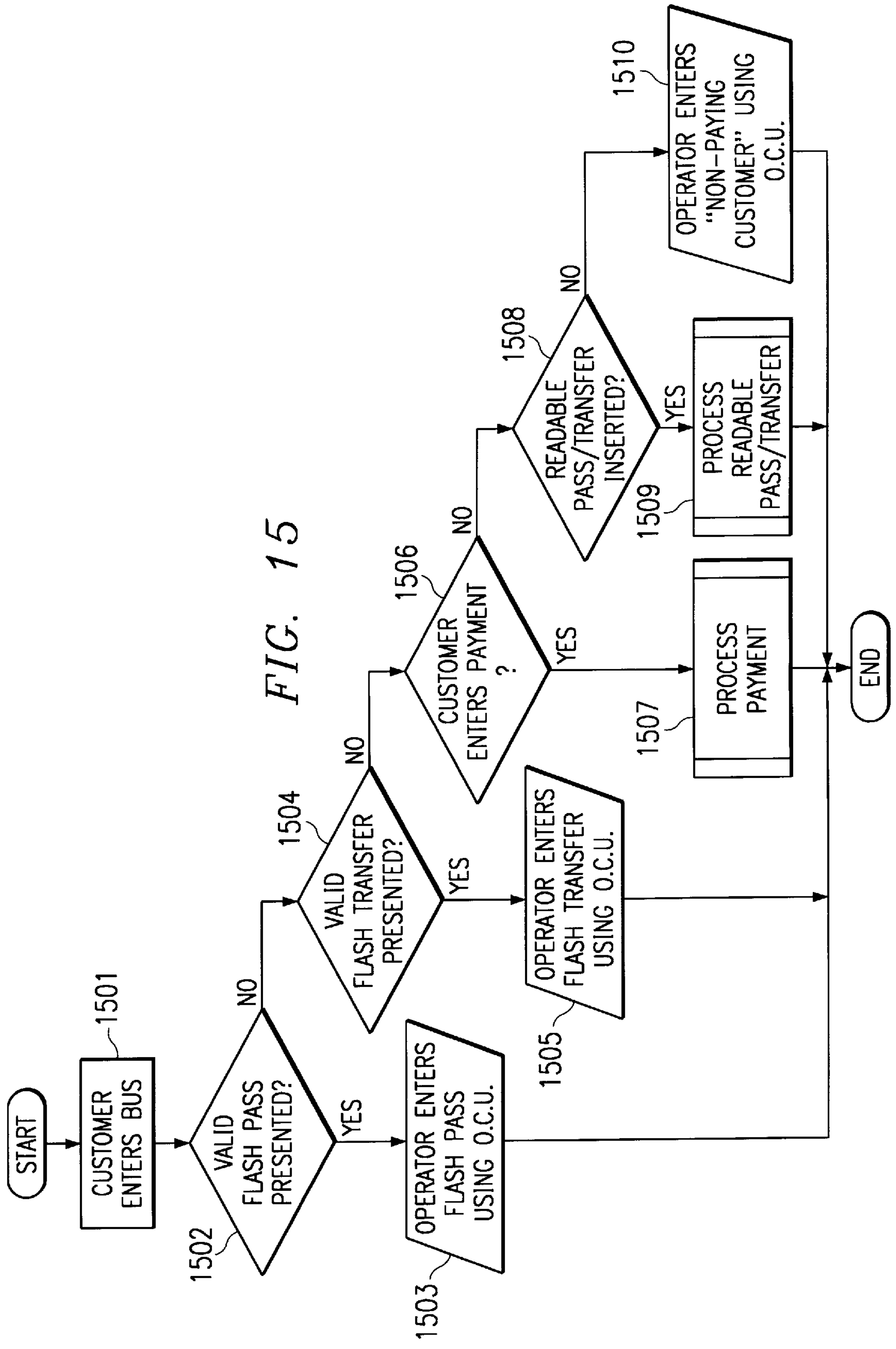
FIG. 15 illustrates a flow diagram of interaction of a patron with the farebox of FIG. 1.

Directing attention to FIG. 15, a flow diagram of interaction of a patron with farebox 100 is illustrated. Initially the patron enters the bus in which farebox 100 is disposed at step 1501. Thereafter, the bus operator determines if the patron presents a valid flash pass at step 1502. It shall be appreciated that a flash pass is a pass which is not machine readable and, therefore, must be viewed by an operator. If a valid flash pass is presented, the operator enters the appropriate information in OCU 150 at step 1503 and the patron is admitted to the bus.

If a valid flash pass is not presented at step 1502, the bus operator determines if the patron presents a valid flash transfer. A flash transfer, like a flash pass, is not machine readable and, therefore, must be viewed by an operator. If a valid flash transfer is presented, the operator enters the appropriate information in OCU 150 at step 1505 and the patron is admitted to the bus.

It shall be appreciated that although the flash pass and flash transfer are not machine readable, the farebox of the preferred embodiment allows for operator input of these transactions. Entry of this information allows for a more complete database of transaction information to be stored and analyzed, such as may be useful in route planning etcetera. Of course, where such information is not desired, entry of information by the operator may be omitted.

If no valid flash transfer was presented in step 1504, then the farebox determines if the patron entered a payment into the coin chute and/or note chute of farebox 100. If payment was entered then farebox 100 proceeds to register and process the payment at step 1507, as will be discussed in detail with respect to FIGS. 17 and 18 hereinbelow, and the patron is permitted to enter the bus.

If no payment was entered at step 1506, then the farebox determines if a readable pass or transfer was inserted in the farebox, such as in note chute 101, at step 1508. If a readable pass or transfer was entered then farebox 100 proceeds to validate and record the pass or transfer information and the patron is permitted to enter the bus at step 1509.

If no readable pass or transfer was entered at step 1508, then the operator may eject the patron from the bus or, circumstances permitting, enter information in OCU 150 reflecting a non-paying patron at step 1510.

Figure 16A:
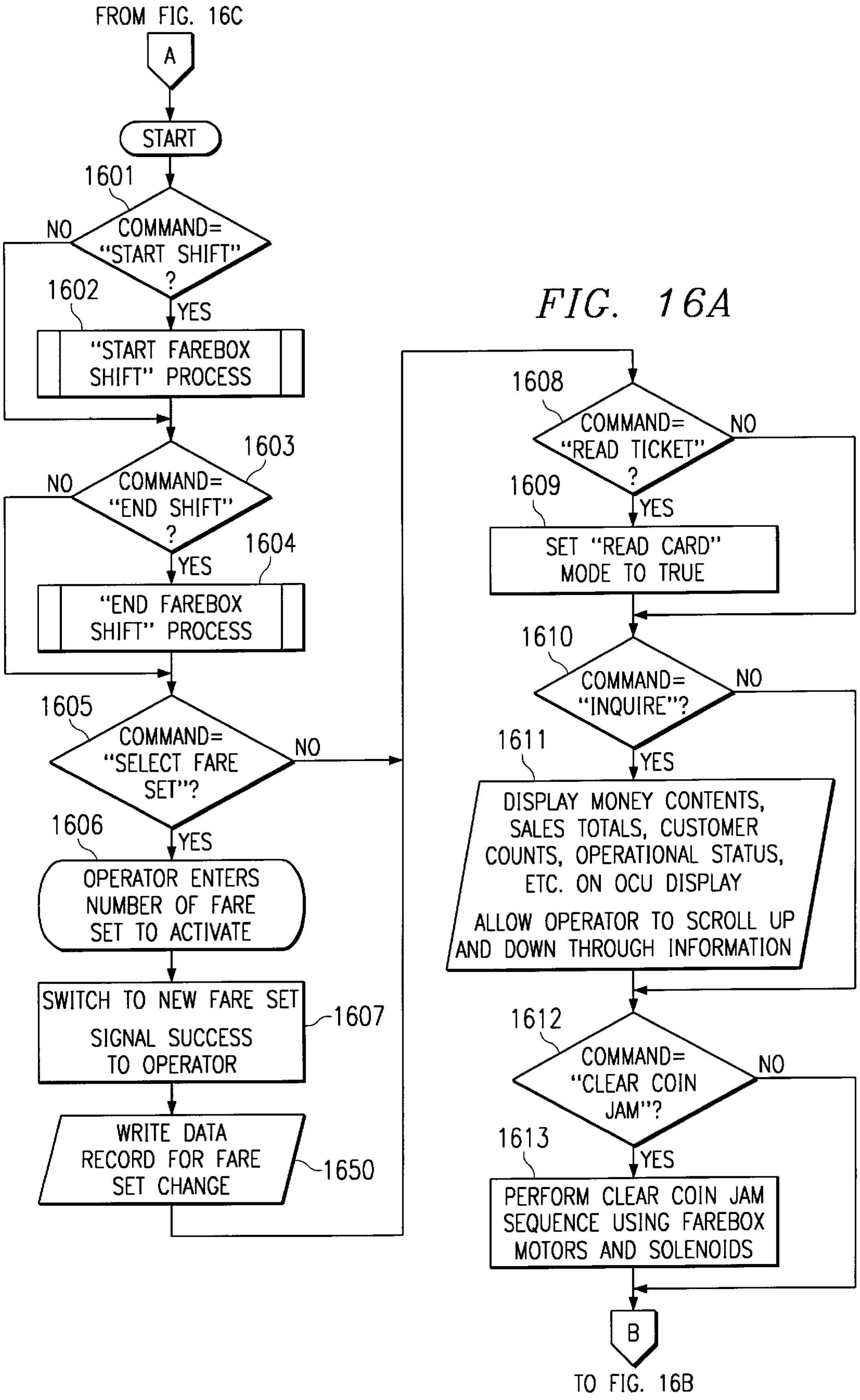
FIGS. 16A through 16C illustrate a flow diagram of interaction of an operator with the farebox of FIG. 1.
Figure 16B:
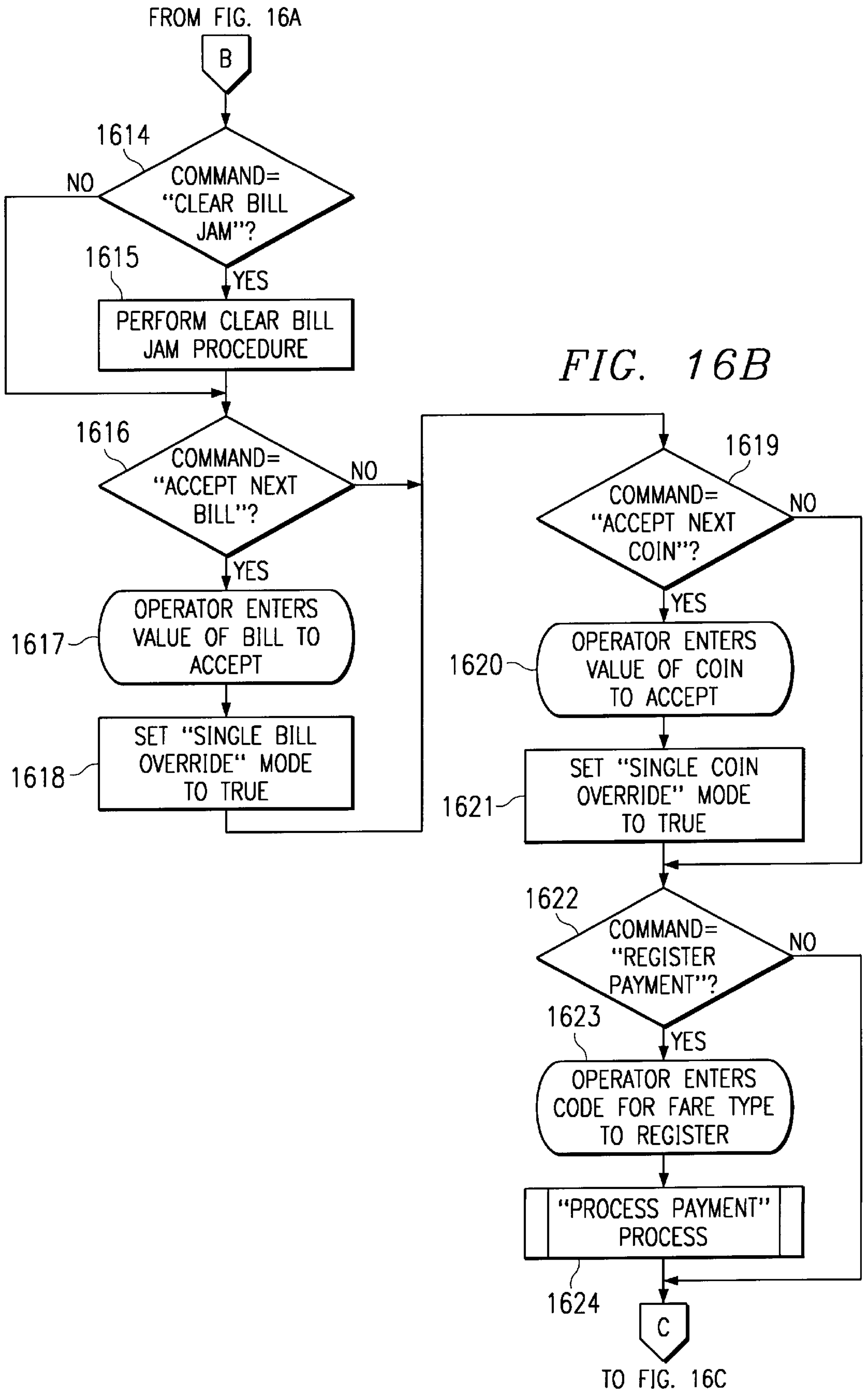
Figure 16C:
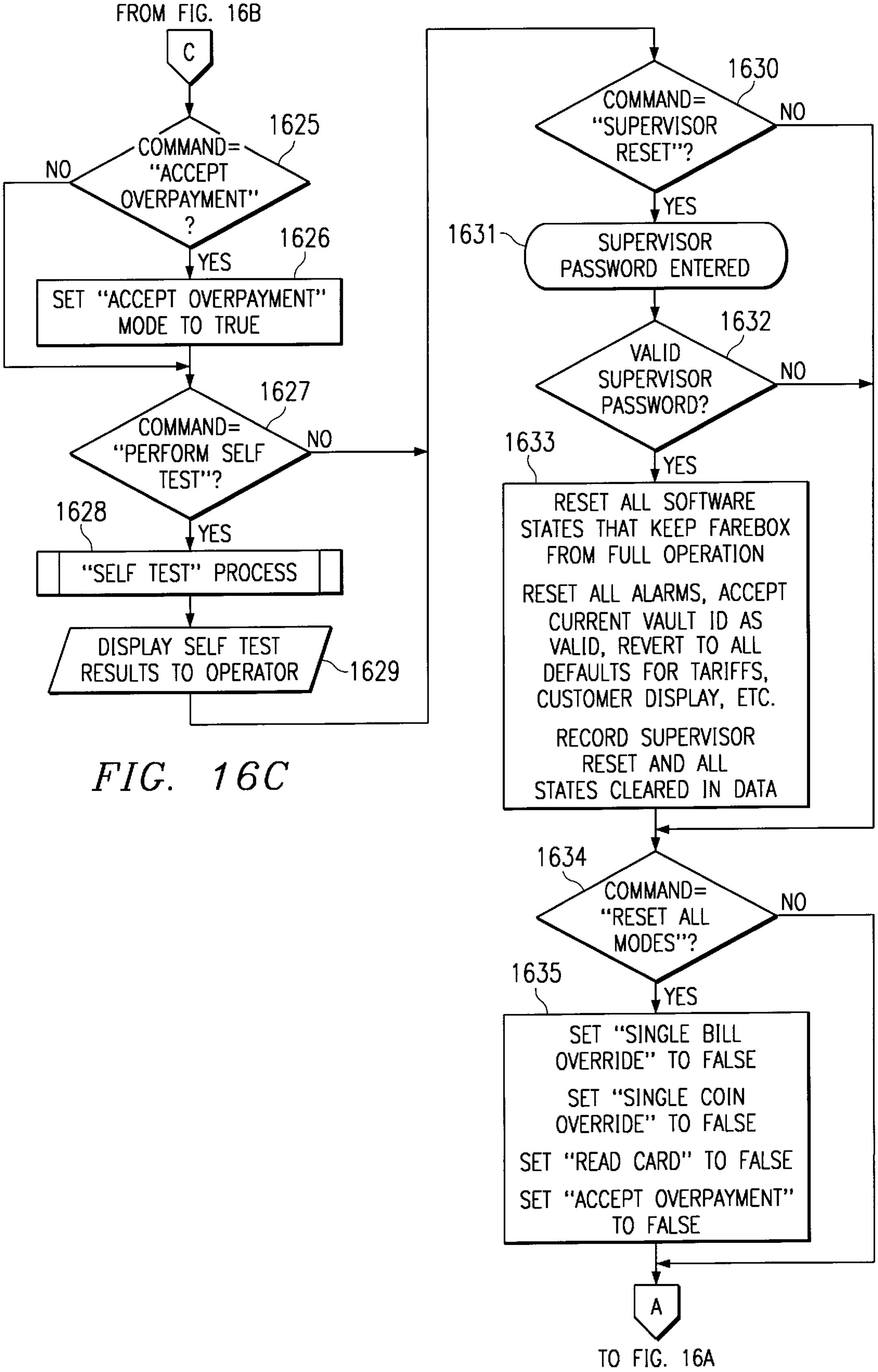

Directing attention to FIGS. 16A through 16C, a flow diagram of interaction of an operator with farebox 100 is illustrated. It shall be appreciated that determination of the command instructions shown in FIGS. 16A through 16C are preferably performed in a continuous loop.

Preferably, in order to enable operation of the farebox, an operator must log in, or otherwise identify him/herself to controller 550. Accordingly, at step 1601 a determination is made as to whether a command for the start of an operator shift has been entered. If so, a process to start an operator shift is conducted at step 1602. This process may include such sub-steps as requesting operator identification and password (PIN). Additionally, house keeping functions, such as zeroing registers and resetting shift tallies may be performed at step 1602. Security features such as limiting times at which a particular operator may log in may also be implemented. Once the operator shift process is complete processing of the loop continues.

In order to provide for logging off of operators at the end of their shift, if a start shift command is not received at step 1601, a determination is made as to whether an end shift command is entered at OCU 150 at step 1603. If an end shift command is entered, processing continues to step 1604 where an end shift process is performed. The end shift process may include multiple sub-steps such as logging off the operator, disabling operation of the farebox until a proper start shift process is performed, and tallying transactions conducted during the shift for storage and analysis. Once the end shift process ends, processing of the loop continues.

If an end shift command is not received at step 1603, then a determination is made as to whether a select fare set command is entered at step 1605. It shall be appreciated that it may be useful to provide multiple fare sets to provide for circumstances such as where a bus operates within areas having routes with different fare structures or where special fares are offered such as on pollution alert days. If a select fare set command is entered then processing proceeds to step 1606 where the operator enters information identifying the fare set to activate. Thereafter, processing continues to step 1607 where controller 550 loads the selected fare set into memory and notifies the operator of success. Processing then continues to step 1650 where controller 550 writes a data record of the fare set change. This data record is useful in providing an audit trail for the transactions conducted with farebox 100. Once the data record is written at step 1607, processing returns to the loop.

If the select fare set command was not detected at step 1605, a determination is made as to whether a read ticket command has been entered at step 1608. If a read ticket command is detected, processing continues to step 1609 where a ticket reading process is performed. Such a process may include sub-steps of activating the read heads of the aforementioned magnetic card swipe slot or instructing note validator 310 to read a machine readable ticket, i.e., pass or transfer. Of course, rather than input by an operator at OCU 150, the read ticket command may be provided automatically by sensors disposed on the device reading the ticket. Likewise, this input may be through input of a patron rather than the operator, if desired. Once the read ticket process has completed, processing returns to the loop.

If no read ticket command was detected at step 1608, processing continues to step 1610 where a determination is made as to the presence of an inquire command. If an inquire command is detected, then processing proceeds to step 1611 where controller 550 interacts with the operator through OCU 150 to query and display the desired information. Once the inquiry is complete processing returns to the loop.

If no inquire command is detected at step 1610, then processing continues to step 1612 where a determination is made as to whether a clear coin jam command has been entered. If a clear coin jam command has been entered, then processing proceeds to step 1613 where a clear coin jam process is performed. The clear coin jam process may include reversing motors of the coin singulator, releasing electronic latches, such as on access panel 140, providing instruction to the operator on operator display 251, and the like. Moreover, information with respect to the jam may be written to a data set such as for statistical purposes and for providing audit trail reflecting anomalous operation during a particular transaction. After the clear bill jam process is completed, processing continues to the loop.

If no clear coin jam command is detected at step 1612, processing continues to step 1614 wherein a determination is made as to whether a clear bill jam command has been entered. If a clear bill jam command has been entered, then processing proceeds to step 1615 where a clear bill jam process is performed. The clear bill jam process may include reversing motors of the note validator, releasing electronic latches, such as on access panel 140 or panel 311, providing instruction to the operator on operator display 251, and the like. Moreover, information with respect to the jam may be written to a data set such as for statistical purposes and for providing audit trail reflecting anomalous operation during a particular transaction. After the clear bill jam process is completed, processing continues to the loop.

If no clear bill jam command is detected at step 1614, processing continues to step 1616 wherein a determination is made as to whether an accept next bill command has been entered. If an accept next bill command has been entered processing continues to step 1617 where the operator enters the value of the bill to be accepted. Thereafter, controller 550 sets the single bill override mode of note validator 550 to true (step 1618) in order to allow the next note to pass to cashbox 560 for storage and processing returns to the loop. It shall be appreciated that the accept next bill command is useful in manually accepting notes which, although legal tender, are worn or otherwise not in a condition for automated validation by note validator 550.

If the accept next bill command is not detected at step 1616, then processing continues to step 1619 wherein a determination is made as to whether an accept next coin command has been entered. If an accept next coin command has been entered processing continues to step 1620 where the operator enters the value of the coin to be accepted. Thereafter, controller 550 sets the single coin override mode of the coin validator of coin system 560 to true (step 1621) in order to allow the next coin to pass to cashbox 560 for storage and processing returns to the loop. It shall be appreciated that the accept next coin command is useful in manually accepting coins which, although legal tender, are worn or otherwise not in a condition for automated validation by the coin validator of coin system 560.

If the accept next coin command is not detected at step 1619, then processing continues to step 1622 wherein a determination is made as to whether a register payment command has been entered. If a register payment command is detected, then processing proceeds to step 1623 where the amounts of accepted monies are written to particular memory areas of controller 550 as described below with respect to FIG. 17. Of course, rather than input by an operator at OCU 150, the register payment command may be provided automatically by sensors disposed to detect the input of coins and/or notes. Likewise, this input may be through input of a patron rather than the operator, if desired. Thereafter, at step 1623 the operator inputs information with respect to a fare type to process the payment. As discussed below with respect to FIGS. 17A through 17B, step 1623 may include a timeout and default fare type selection in the event that the operator is unable to provide the fare processing information. From step 1623, processing continues to step 1624 wherein a process payment process is performed. The preferred embodiment of the process payment process is described with respect to FIGS. 18A and 18B hereinbelow. Once the process payment process has completed, processing returns to the loop.

If no register payment command was detected at step 1622, processing continues to step 1625 wherein a determination is made as to whether an accept overpayment command has been entered. If an accept overpayment command is detected, then processing proceeds to step 1626 to force all monies counted by the farebox, but not yet allocated to a fare, to be recognized as a single fare payment transaction for the next fare registered by the operator. Thereafter, processing returns to the loop.

The remaining steps illustrated in FIGS. 16A through 16C are typically associated with supervisor or maintenance functions of the farebox. Accordingly, valid entry of these commands may also require entry of an authorization code or log in of a particular user ID in order to perform the associated steps.

If an accept overpayment command is not detected at step 1625, then processing continues to step 1627 wherein a determination is made as to whether a valid perform self test command has been entered. If a valid perform self test command has been entered then processing proceeds to step 1628 where a self test process is performed. This self test process may include parity check of controller 550 memory, cycling of various components and the monitoring of associated sensors, and the like in order to detect malfunction of the farebox. A data record may be written indicating any error conditions detected and/or the activation and completion of the self test process. Upon the completion of the self test process, processing continues to step 1629 where the results of the self test are presented to the operator, such as through operator display 251. Thereafter, processing returns to the loop.

If no perform self test command was detected at step 1627, processing continues to step 1630 wherein a determination is made as to whether a supervisor reset command has been entered. If a supervisor reset command has been entered processing proceeds to step 1631 wherein input of a password is accepted. Thereafter, a determination is made as to whether the password is valid at step 1632. If the password is not valid then processing returns to the loop. However, if the password is valid then processing proceeds to step 1633 where all software states that prevent full operation of the farebox are reset. Additionally, all alarms and error conditions are reset and information regarding the supervisor reset process being activated are written to a data record. Upon completion of the supervisor reset process, processing returns to the loop.

If no supervisor reset command is detected at step 1630, processing continues to step 1634 wherein a determination is made as to whether a reset all modes command has been entered. If a reset all modes command has been entered, processing proceeds to step 1635 wherein all modifiable mode conditions are reset to their normal state. Thereafter processing returns to the loop.

Figure 17A:
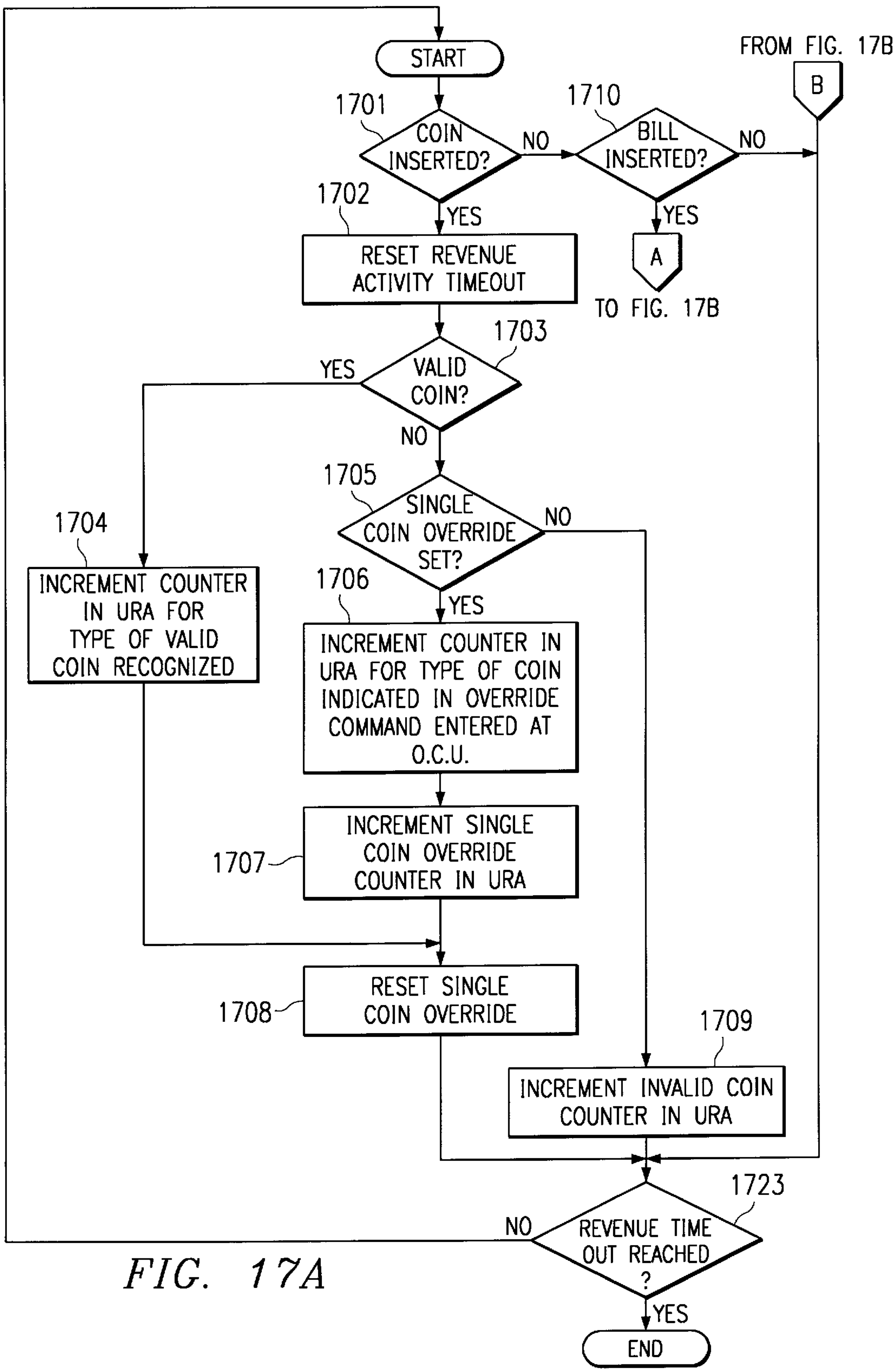
FIGS. 17A through 17B illustrates a flow diagram of the preferred embodiment of a register payment process of the farebox of FIG. 1.
Figure 17B:
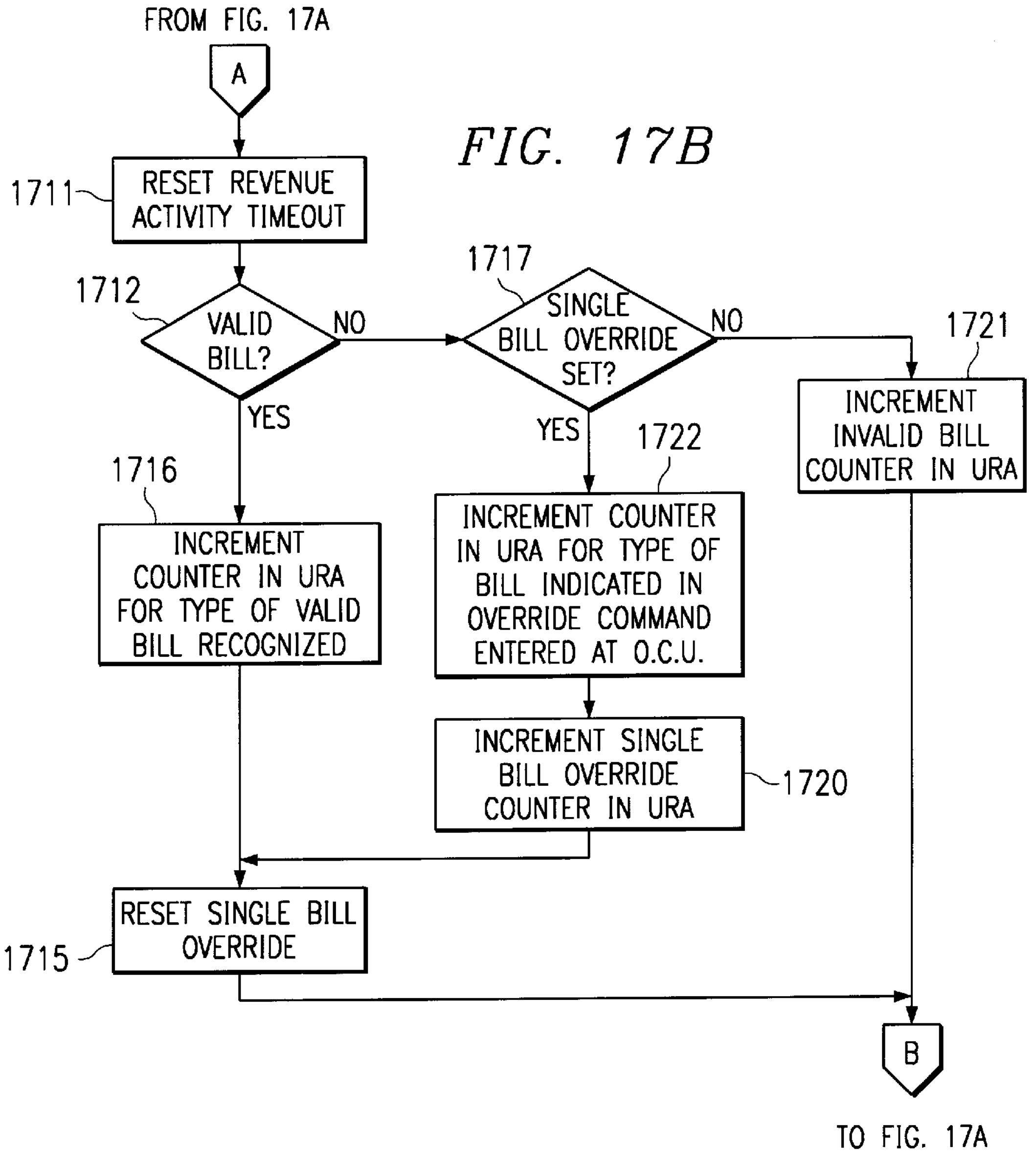
Figure 18A:
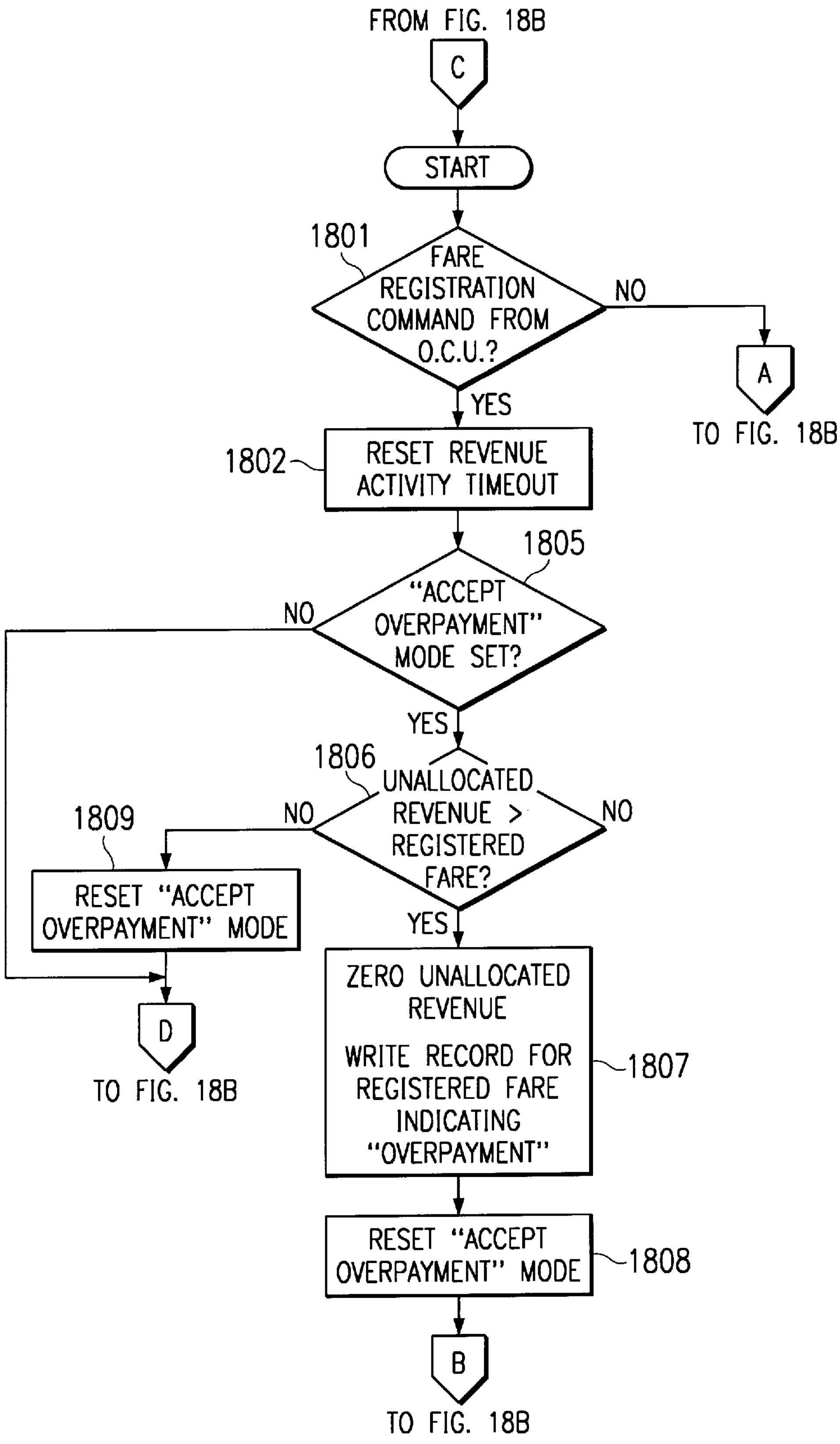
FIGS. 18A through 18B illustrate a flow diagram of the preferred embodiment of a process payment process of the farebox of FIG. 1.
Figure 18B:
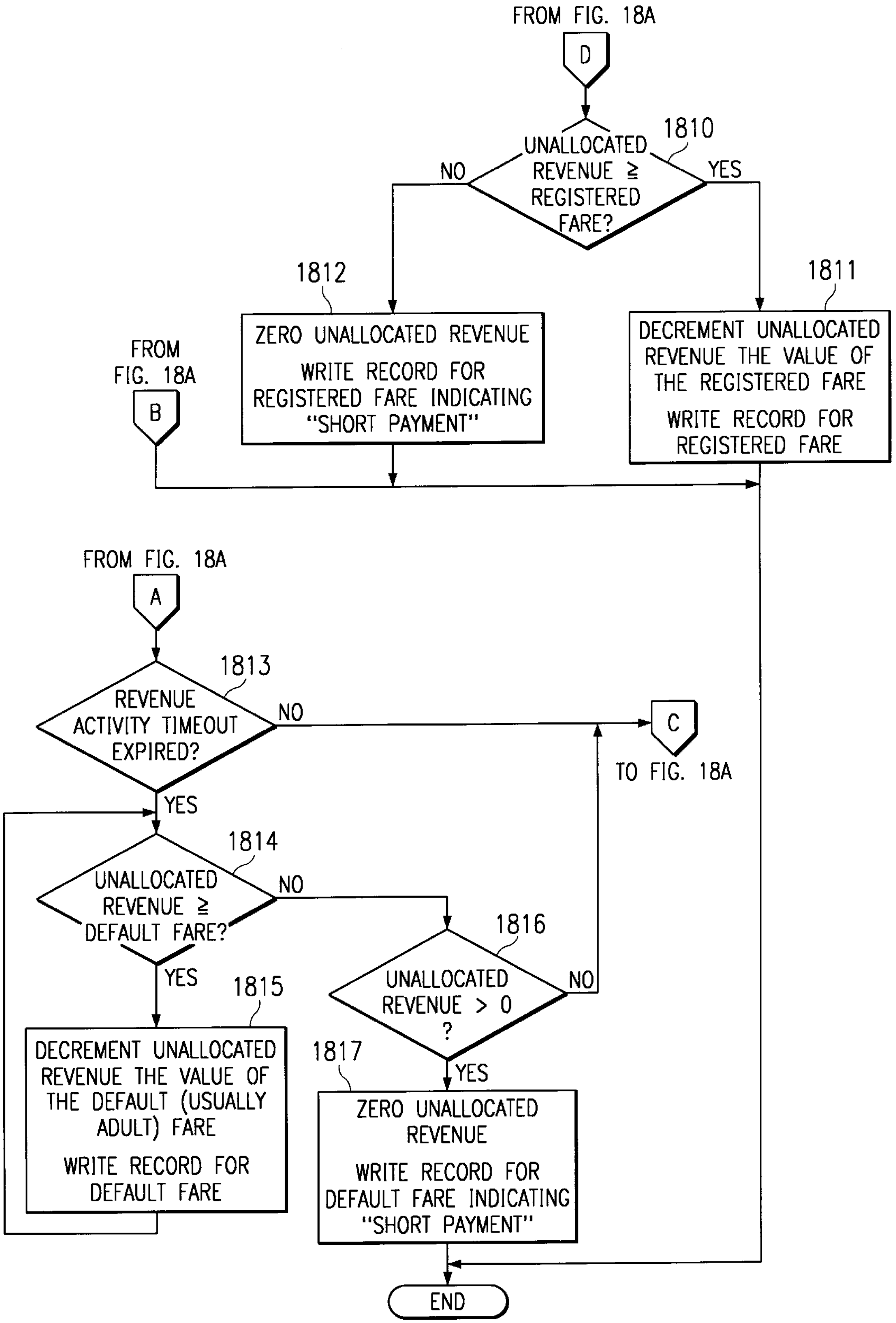

Having described interaction of an operator with farebox 100 with respect to the flow diagram of FIGS. 16A through 16C, the preferred embodiment of processes of registering a payment and processing a payment will be described is illustrated in FIGS. 17 and 18A through 18B respectively.

Directing attention to FIGS. 17A through 17B, a flow diagram of the preferred embodiment of a register payment process is shown. The register payment process operates to monitor the coin and note systems, incrementing the appropriate counters in the unallocated revenue accumulator (URA) of controller 550 as coins and notes are inserted by patrons and accepted by farebox 100. The process payment process of FIGS. 18A through 18B then operates to decrement these counters as revenue is allocated to fare transactions.

As shown in FIGS. 17A through 17B, a determination is made at step 1701 as to whether a coin has been inserted in the coin system of farebox 100. If a coin has been inserted, processing proceeds to step 1702 where a revenue activity timeout is reset. This timeout may be utilized to detect the conclusion of input by a patron for a single transaction as well as to power down devices, such as coin singulator 320, between paying patrons.

From step 1702, processing continues to step 1703 wherein a determination is made as to whether the inserted coin is valid. It shall be appreciated that this determination is preferably made from input from the coin validator of coin system 520. If the coin is determined to be valid, then a counter in the URA of controller 550 is incremented for the type of valid coin recognized. Again, it shall be appreciated that information with respect to the type of coins is preferably made from input from the coin validator of coin system 520. After incrementing the appropriate counter in the URA, processing proceeds to step 1708 wherein single coin override is reset. Thereafter, a determination is made at step 1723 as to whether the revenue timeout has been reached, i.e., time enough for a single patron to input all monies for a single transaction has transpired. If the timeout has not been reached then the process loops back to the beginning to register additional coins or notes. However, if the timeout has been reached then the registration process is complete for this transaction.

If at step 1703 it is determined that a valid coin has not been received, then processing proceeds to step 1705 wherein a determination is made as to whether the single coin override has been set. If the single coin override has been set then processing proceeds to step 1706 where a counter in the URA of controller 550 is incremented for the type of coin indicated in the coin override command at step 1704. Thereafter, at step 1707, the a single coin override counter in the URA is incremented. After incrementing the counter in the URA at step 1707, processing proceeds to step 1708 wherein single coin override is reset. Thereafter, a determination is made at step 1723 as to whether the revenue timeout has been reached. If the timeout has not been reached then the process loops back to the beginning to register additional coins or notes. However, if the timeout has been reached then the registration process is complete for this transaction. Of course, steps 1705–1708 may be omitted where it is not desired to allow an operator to override the rejection of a coin by the validator.

If the single coin override is not determined to be set at step 1705, then processing proceeds to step 1709 where an invalid coin counter in the URA is incremented. Thereafter, a determination is made at step 1723 as to whether the revenue timeout has been reached. If the timeout has not been reach then the process loops back to the beginning to register additional coins or notes. However, if the timeout has been reached then the registration process is complete for this transaction.

If a coin is not determined to have been inserted at step 1701, then processing proceeds to step 1710 wherein a determination is made as to whether a note has been inserted into farebox 100. If no note has been inserted then a determination is made at step 1723 as to whether the revenue timeout has been reached. If the timeout has not been reach then the process loops back to the beginning to register additional coins or notes. However, if the timeout has been reached then the registration process is complete for this transaction.

If a note has been inserted, processing proceeds to step 1711 where a revenue activity timeout is reset. From step 1711, processing continues to step 1712 wherein a determination is made as to whether the inserted note is valid. It shall be appreciated that this determination is preferably made from input from note validator 310. If the note is determined to be valid, then a counter in the URA of controller 550 is incremented for the type of valid note recognized at step 1716. Again, it shall be appreciated that information with respect to the type of notes is preferably made from input from the note validator 310. After incrementing the appropriate counter in the URA, processing proceeds to step 1715 wherein single bill override is reset. Thereafter, a determination is made at step 1723 as to whether the revenue timeout has been reached. If the timeout has not been reach then the process loops back to the beginning to register additional coins or notes. However, if the timeout has been reached then the registration process is complete for this transaction.

If at step 1712 it is determined that a valid note has not been received, then processing proceeds to step 1717 wherein a determination is made as to whether the single bill override has been set. If the single bill override has been set then processing proceeds to step 1722, where a counter in the URA of controller 550 is incremented for the type of note indicated in the note override command at step 1722. Thereafter, at step 1720, the a single bill override counter in the URA is incremented. After incrementing the counter in the URA at step 1720, processing proceeds to step 1715 wherein single bill override is reset. Thereafter, a determination is made at step 1723 as to whether the revenue timeout has been reached. If the timeout has not been reach then the process loops back to the beginning to register additional coins or notes. However, if the timeout has been reached then the registration process is complete for this transaction. Of course, steps 1715 and 1717–1720 may be omitted where it is not desired to allow an operator to override the rejection of a note by the validator.

If the single bill override is not determined to be set at step 1717, then processing proceeds to step 1721 where an invalid bill counter in the URA is incremented. Thereafter, a determination is made at step 1723 as to whether the revenue timeout has been reached. If the timeout has not been reach then the process loops back to the beginning to register additional coins or notes. However, if the timeout has been reached then the registration process is complete for this transaction.

Although the registration process of FIGS. 17A through 17B is shown utilizing a timeout condition to determine completion of revenue input by a patron, it shall be appreciated that other conditions may also be utilized to indicate such completion. For example, entry of a command to process the payment by an operator may be utilized to indicate completion of the revenue input as well as to process the payment as described below with respect to FIGS. 18A and 18B.

Having described a preferred embodiment of the register payment process of the present invention with respect to the flow diagram of FIGS. 17A through 17B, a preferred embodiment of the process payment with respect to FIGS. 18A and 18B will be described is illustrated in FIGS. 18A and 18B.

Directing attention to FIGS. 18A and 18B, a flow diagram of the preferred embodiment of a process payment process is shown. The process payment process operates to decrement the counters for valid coins and notes registered in the URA of controller 550 and moves this revenue to fare transaction records stored in controller 550. Fare transactions are preferably indicated either by operator action through OCU 150 or by default if the unallocated revenue remains after a selected timeout value elapses without input from the OCU.

As shown in FIG. 18A, a determination is made at step 1801 as to whether a fare registration command has been received from the OCU. If a fare registration command is received then a revenue activity timeout is reset at step 1802.

Thereafter, a determination is made as to whether an accept overpayment mode has been set at step 1805. If an accept overpayment mode has been set the processing proceeds to step 1806 wherein a determination is made as to whether the unallocated revenue is greater than the registered fare. If it is determined that the unallocated revenue is greater than the registered fare the processing proceeds to step 1807 where controller 550 operates to zero unallocated revenue and write a record for registering the fare indicating an overpayment. Thereafter, at step 1808, the accept overpayment mode is reset and the process payment process ends.

If, however, at step 1805 it is determined that the accept overpayment mode is not set or at step 1806 it is determined that the unallocated revenue is not greater than the registered fare, processing proceeds to step 1810. However, it shall be appreciated, if it is determined at step 1806 that the unallocated revenue is not greater than the registered fare, that the intermediate step of resetting the accept overpayment mode at step 1809 is performed prior to proceeding to step 1810.

At step 1810 a determination is made as to whether the unallocated revenue is greater or equal to the registered fare. If it is determined that the unallocated revenue is greater or equal to the registered fare then processing proceeds to step 1811 where the unallocated revenue is decremented, a record is written for the registered fare, and the process payment process ends. If, however, it is determined that the unallocated revenue is not greater or equal to the registered fare then processing proceeds to step 1812 where the unallocated revenue is zeroed, a record is written for the registered fare indicating a short payment, and the process payment process ends.

If at step 1801 it is determined that a registration command has not been received from OCU 150, the processing proceeds to step 1813 wherein a determination is made as to a revenue activity timeout having expired. If the revenue activity timeout has not expired then processing returns to the beginning of the process once again.

If the revenue activity timeout is determined to have expired, the processing continues to step 1814 wherein a determination is made as to whether the unallocated revenue is greater than or equal to the default fare. If the unallocated revenue is greater than or equal to the default fare then processing proceeds to step 1815 where the unallocated revenue is decremented, a record is written for the default fare, and the process payment process returns again to step 1814.

If at step 1814 it is determined that the unallocated revenue is not greater than or equal to the default fare, then processing proceeds to step 1816 where a determination is made as to whether the unallocated revenue is greater than zero. If the unallocated revenue is not greater than zero then processing returns to the beginning of the process once again. However, if the unallocated revenue is greater than zero then processing proceeds to step 1817 where the unallocated revenue is zeroed, a record is written for the default fare indicating a short payment, and the process payment process ends.

In operation, the information with respect to transactions both automatically determined by controller 550 and input by an operator via OCU 251 stored in controller 550 are used by a central authority in accounting for monies collected by farebox 100. Systems and methods for the use of such a farebox by a control authority are shown and described in the above referenced patent application entitled "SYSTEM AND METHOD FOR PROVIDING FARE BOX ACCOUNTABILITY". Accordingly, upon the occurrence of a predetermined condition, such as the return of the bus to the garage at the end of the day or the storage capacity of cashbox 560 being reached, controller 550 is polled for information stored therein.

Polling may be accomplished through coupling a polling device to controller 550, such as through interfaces 551 or 552 or through the use of a wireless link as might be established using an infrared link or via radio frequency link, which may be established through an existing bus radio communication system.

The polled information may include not only totals of the monies collected, but detail as to the transactions conducted as entered by the operator or determined by the farebox as shown above. Moreover, this information may also be associated with information identifying the cashbox into which the monies were stored. Thus accounting may be accomplished down to the farebox where the monies of each cashbox are stored separately until counting, such as within the removable cashbox itself.

It shall be appreciated that, as shown and described above, operation of the preferred embodiment of the disclosed farebox may be without substantial operator input. Specifically, acceptance, validation, and registration of payments for transactions are all accomplished without operator input. An operator need never see monies tendered or machine readable passes in order for their rapid and accurate entry into the farebox of the present invention. Moreover, the present invention provides functionality enhancing operator interaction, such as through enhanced feed back and querying.

Although specific examples of use of the present invention has been shown and described with respect to a farebox for passenger fare collection, it shall be appreciated that the transaction station of the present invention may be utilized in any number of situations. For example, the transaction station may be used at any point of sale such as at an entrance to a movie theater or sporting event. Moreover, the transaction station of the present invention may be utilized in vending of goods such as through coupling with a goods vending apparatus or its inclusion within the transaction station.

Additionally, although described with respect to an operator thereof, the transaction station of the present invention may also be utilized without direct operator intervention, if desired. For example, input devices such as the OCU may be disposed on the transaction station for patrons to make selections as to the transaction being conducted.

Alternatively, remote supervision by an operator may be accomplished. For example, where a plurality of transaction stations are utilized concurrently, such as at the aforementioned sporting events, a single operator may supervise multiple ones of the transaction stations such as by remotely locating each of their OCUs or by coupling the transaction stations to a network such as a LAN.

Although the present invention and its advantages have been described in detail, it should be understood that various changes, substitutions and alterations can be made herein without departing from the spirit and scope of the invention as defined by the appended claims.

What is claimed is:

1. A payment validation and accounting system to provide validation of both tendered coins and notes, the system comprising:
- means for accepting coins tendered by a patron, the coin accepting means including:
  - means for receiving a plurality of coins, wherein the plurality of coins received may include coins of different values;
  - means for singulating the plurality of coins; and
  - means operable without operator input for determining the validity and value of the received plurality of coins as legal tender, wherein ones of the received plurality of coins determined not to be legal tender are rejected;
- means for accepting notes tendered by a patron, the note accepting means including:
  - means for receiving a plurality of different value notes; and
  - means operable without operator input for determining the validity and value of the received notes; and
- means for controlling the system including:
  - means for accepting input from an operator associated with the tender by the patron of the valid received plurality of coins and the valid received notes.

2. The system of claim 1, wherein the controlling means further includes:
- means operative in conjunction with the coin accepting means and the note accepting means for tallying the values of the valid received plurality of coins and the valid received notes; and
- means for displaying the tallied values to the operator.

3. The system of claim 1, further comprising:
- means for interfacing with a component external to the system, wherein information associated with the tender of the valid coins and notes is also accepted from the interfaced component.

4. The system of claim 1, further comprising:

means for interfacing with a component external to the system, wherein information associated with the tender of the valid coins and notes is delivered to the interfaced component.

5. The system of claim 1, further comprising:

means for displaying information including the tallied values to the patron.

6. The system of claim 3, wherein the information displayed to a patron includes instructional prompts.

7. The system of claim 3, wherein the information displayed to a patron includes advertisements.

8. The system of claim 1, further comprising:

means for securely storing the valid received plurality of coins and the valid received notes.

9. The system of claim 8, wherein the operator may access the coin accepting means and the note accepting means to remove coins and notes prior to their passing to the secure storing means.

10. The system of claim 1, wherein the coin singulating means includes means for passing coins to be validated no faster than a predetermined maximum rate regardless of the value of particular coins of the received plurality of coins.

11. The system of claim 1, wherein the note accepting means further comprises:

means for validating proprietary vouchers.

12. The system of claim 11, wherein the displaying means displays information regarding the valid proprietary vouchers.

13. The system of claim 1, wherein the note accepting means further comprises:

means for stacking the valid received notes.

14. The system of claim 13, wherein the note accepting means further comprises:

means for rejecting notes not received in a proper orientation, wherein the note stacking means operates to stack the valid received notes in a predetermined orientation for automatic counting upon removal from the system.

15. The system of claim 1, wherein the operator input accepting means comprises:

means for programming keys for preselected functions of the system.

16. The system of claim 1, further comprising:

means for communicating information regarding the valid received plurality of coins, the valid received notes, and the operator input associated with the tender of the valid received plurality of coins and the valid received notes to an external processor based system.

17. The system of claim 16, wherein the communicating means comprises an infrared data link.

18. The system of claim 16, wherein the communicating means comprises a radio frequency link.

19. The system of claim 18, wherein the radio frequency link comprises a communications radio used for voice communication.

20. The system of claim 1, wherein the system is disposed in a case for mounting in a conveyance.

21. The system of claim 20, wherein the conveyance is selected from the group consisting of:

a bus;

a train;

a van; and a plane.

22. A method for payment validation and accounting to provide validation of both tendered coins and notes, the method comprising the steps of:

receiving a plurality of individual payments, wherein ones of the individual payments comprise coins and ones of the individual payments comprise notes, wherein the receiving step includes the steps of:

accepting coins tendered including the steps of:

receiving a plurality of coins, wherein the plurality of coins received can include coins of different values;

singulating the coins;

automatically determining the validity of the received coins as legal tender and the value of the valid received coins;

storing the valid received coins in a restricted access vault substantially immediately after the coin validity and value determining step; and automatically rejecting ones of the received coins determined not to be legal tender; and accepting notes tendered including the steps of:

receiving a plurality of different value notes;

automatically determining the validity of the received notes as legal tender and the value of the valid received notes;

storing the valid received notes in a restricted access vault substantially immediately after the note validity and value determining step; and automatically rejecting ones of the received notes determined not to be legal tender.

23. The method of claim 22, further comprising the step of:

displaying a tally of each of the individual payments to an operator separate from a person tendering payment, wherein the displayed tally is a function of the coin value determining step and the note value determining step.

24. The method of claim 23, further comprising the steps of:

accepting information associated with the individual payments from the operator; and storing information regarding the individual payments and the associated information accepted from the operator in a memory for reconciliation of the received valid coins and received valid notes.

25. The method of claim 22, wherein the individual payment receiving step further comprises the step of:

accepting proprietary vouchers including the steps of:

receiving a plurality of different proprietary vouchers;

automatically determining the validity of the received vouchers;

automatically determining an individual payment represented by the valid proprietary voucher; and rejecting ones of the received proprietary vouchers determined not to be valid.

26. The method of claim 22, wherein the note storing step comprises the step of:

stacking the valid received notes.

27. The method of claim 26, wherein the note accepting step further comprises:

rejecting notes not received in a proper orientation, wherein the note stacking step stacks the valid received notes in a predetermined orientation for automatic counting.

28. The method of claim 22, further comprising the step of:

programming keys for preselected functions of the system.

29. The method of claim 22, further comprising the step of:

communicating information regarding the individual payments including information regarding valid received plurality of coins, the valid received notes, and the operator input associated with individual payments to a system for reconciliation of the received valid coins and received valid notes.

30. The method of claim 29, further comprising the step of:

automatically releasing a secure panel upon successful communication of the information.

31. An automatic validating farebox system comprising: electronic controller circuitry;

a note acceptor coupled to the electronic controller circuitry, wherein the note acceptor is adapted to receive a plurality of different value notes, and wherein the note acceptor automatically validates the received notes and determines the value of each validated received note, wherein the value of each validated received note is communicated to the electronic controller circuitry;

a note stacker adapted to receive the accepted notes from the note acceptor and output the accepted notes into a tightly compressed note stack;

a farebox housing incarcerating said electronic controller circuitry, said note acceptor, and said note stacker, wherein said farebox housing is adapted for deployment in a vehicle and presents patron access to a portion of said note acceptor while simultaneously presenting operator access to another portion of said note acceptor.

32. The system of claim 31, further comprising:

a coin acceptor coupled to the electronic controller circuitry, wherein the coin acceptor is adapted to receive a plurality of different value coins, and wherein the coin acceptor automatically validates the received coins and determines the value of each validated received coin, wherein the value of each validated received coin is communicated to the electronic controller circuitry.

33. The system of claim 32, further comprising:

a coin singulator adapted to receive a plurality of different value coins and to singulate the received coins for provision to the coin acceptor at a predetermined rate.

34. The system of claim 31, wherein the electronic controller circuitry comprises:

a general purpose processor-based system.

35. The system of claim 31, wherein the note acceptor is also adapted to receive vouchers, wherein the note acceptor automatically validates the received vouchers.

36. The system of claim 31, wherein the note stacker comprises:

a note feed mechanism to transmit accepted notes from the note acceptor to a position in juxtaposition with the tightly compressed note stack; and a plunger mechanism to compress the transported note into the tightly compressed note stack.

37. The system of claim 36, wherein the plunger mechanism includes a note transfer surface adapted to provide mechanical control over the transported note when transitioning from the feed mechanism to the tightly compressed note stack.

38. The system of claim 36, wherein operation of the plunger mechanism is controlled as a function of time from the received accepted note passing a sensor in the feed mechanism.

39. The system of claim 36, wherein the feed mechanism includes a sensor operable with the electronic controller circuitry to detect a note feed jam.

40. The system of claim 31, wherein the electronic controller circuitry includes circuitry and an instruction set for communicating information to a data collection device external to the automatic validating farebox system.

41. An automatic validating farebox system comprising: electronic controller circuitry;

a coin acceptor coupled to the electronic controller circuitry, wherein the coin acceptor is adapted to receive a plurality of different value coins, and wherein the coin acceptor automatically validates the received coins and determines the value of each validated received coin, wherein the value of each validated received coin is communicated to the electronic controller circuitry;

a note acceptor coupled to the electronic controller circuitry, wherein the note acceptor is adapted to receive a plurality of different value notes, and wherein the note acceptor automatically validates the received notes and determines the value of each validated received note, wherein the value of each validated received note is communicated to the electronic controller circuitry; and a note stacker adapted to receive the accepted notes from the note acceptor and output the accepted notes into a tightly compressed note stack, a farebox housing incarcerating said electronic controller circuitry, said coin acceptor, said note acceptor, and said note stacker, wherein said farebox housing is adapted for deployment in a vehicle and presents patron access to a portion of said coin acceptor and a portion of said note acceptor while simultaneously presenting operator access to another portion of said coin acceptor and said note acceptor.

42. The system of claim 41, wherein the electronic controller circuitry comprises:

a general purpose processor-based system.

43. The system of claim 41, further comprising:

a coin singulator adapted to receive a plurality of different value coins and to singulate the received coins for provision to the coin acceptor at a predetermined rate.

44. The system of claim 43, further comprising:

a housing incarcerating the electronic controller circuitry, the coin acceptor, the coin singulator, the note acceptor, and the note stacker, wherein the housing provides secure storage of the accepted received coins and the accepted received notes, and wherein the housing includes an operator access panel to provide field access to the coin singulator and the note acceptor to provide operator access to received coins and received notes prior to their validation by the coin acceptor and note acceptor.

45. The system of claim 44, wherein the operator access panel is adapted to allow an operator to clear a jam in the coin singulator and the note acceptor.

46. The system of claim 44, wherein the operator access panel includes a sensor coupled to the electronic controller circuitry to communicate information with respect to operator access of the operator access panel.

47. The system of claim 44, wherein the housing comprises:

a note receiving surface to facilitate reception of notes by the note acceptor.

48. The system of claim 41, further comprising:

an operator control unit coupled to the electronic controller circuitry having an operator display and an operator input device, wherein the operator input device includes at least one key which is programmable by the electronic controller circuitry.

49. The system of claim 48, wherein at least one programmable key is programmed to provide selection of a function from the group consisting of:

entry of a type of fare;

entry of a service condition; and entry of a desired farebox operation.

50. The system of claim 48, wherein the operator display displays the value of received accepted coins and received accepted notes.

51. The system of claim 41, wherein the note acceptor is also adapted to receive vouchers, wherein the note acceptor automatically validates the received vouchers.

52. The system of claim 41, wherein the electronic controller circuitry includes circuitry and an instruction set for communicating information to a data collection device external to the automatic validating farebox system.

53. An automatic validating farebox for providing automatic validation of coins and notes tendered in payment of a fare without the aid of an operator, the farebox comprising:

a coin system adapted to receive different value coins, wherein the coin system includes a singulator to receive a plurality of coins substantially simultaneously and provide the coins serially for validation, wherein the coin singulator is operator accessible to allow an operator to remove received coins, and wherein the coin system includes a coin validator rejecting invalid coins and determining the value of valid coins, wherein the coin validator is not operator accessible, and wherein the coin system allows valid coins to proceed within the farebox for substantially immediate secure storage without operator input;

a note system adapted to receive different value notes, wherein the note system includes a note validator rejecting invalid notes and determining the value of valid notes, wherein the note validator is accessible to an operator to allow an operator to remove received notes prior to their successful validation, wherein the note system allows valid notes to proceed within the farebox for substantially immediate secure storage without operator input;

a vault coupled to the coin system and to the note system, wherein the vault provides the secure storage of the valid coins and valid notes;

a note stacker coupling the note system with the vault, wherein the note stacker receives valid notes from the note system and causes their tight stacking in the vault; and an electronic controller coupled to the coin system and the note system, wherein the processor communicates with the coin system and the note system to receive and store information with respect to the value of valid coins and valid notes.

54. The system of claim 53, wherein the note validator also rejects notes not having a predetermined orientation and allows only notes having the predetermined orientation to pass in order to allow the note stacker to create a tight stack of notes configured for automated sorting and counting.

55. The system of claim 53, wherein the farebox includes a case adapted for disposal in a bus, wherein a receiving chute associated with the coin system and a receiving surface associated with the note system is presented to a bus patron while an access panel allowing the operator access of the coin singulator and the note validator are presented to a bus operator.

56. The system of claim 55, further comprising:

an operator control unit coupled to the electronic controller to allow input regarding the fare, wherein the operator control unit includes keys programmable with selected functions of the farebox.

57. The system of claim 56, wherein the operator control unit is mounted on the case.

58. The system of claim 56, wherein the operator control unit is mounted in the bus other than on the case.

59. An automatic validating farebox for providing automatic validation of coins and notes tendered in payment of a fare without the aid of an operator, the farebox comprising:

a coin system adapted to receive different value coins, wherein the coin system includes a coin validator rejecting invalid coins and determining the value of valid coins, wherein the coin validator is not operator accessible, and wherein the coin system allows valid coins to proceed within the farebox for secure storage, and wherein the coin system includes a singulator to receive a plurality of coins substantially simultaneously and provide the coins serially for validation, wherein the coin singulator comprises:

a rotating surface disposed to receive a plurality of coins substantially simultaneously, the rotating surface providing a friction sufficiently great to provide movement of the received coins in the direction of rotation of the rotating surface, wherein the friction is sufficiently small to allow the received coins to travel radially outward across the rotating surface;

a frame disposed above the rotating surface, the frame providing an incarcerating wall surface in combination with the rotating surface defining a coin reception area, wherein the incarcerating wall limits the radially outward travel of the received coins across the rotating surface, and wherein the incarcerating wall provides a substantially smooth surface where the received coins come into contact with the incarcerating wall, and wherein the frame includes bearings disposed thereon rotatably engaging the rotating surface;

a first cylinder having a first diameter disposed to engage coins near the incarcerating wall, wherein a longitudinal surface of the first cylinder is substantially parallel to the rotating surface and is disposed a predetermined distance from the rotating surface, and wherein the first cylinder rotates in a direction opposing the movement of the received coins provided by the rotating surface;

a second cylinder having a second diameter disposed to engage coins near the incarcerating wall, wherein a longitudinal surface of the second cylinder is substantially parallel to the rotating surface and is movably mounted to allow the longitudinal surface of the second cylinder to travel a predetermined range of distances from the rotating surface, and wherein the longitudinal surface of the second cylinder is in mechanical communication with the longitudinal surface of the first cylinder thereby causing the second cylinder to rotate in a direction opposite that of the first cylinder; and a biasing spring assembly coupled to the second cylinder and providing a first force component to maintain the mechanical communication of the longitudinal surface of the first cylinder and the longitudinal surface of the second cylinder, wherein the biasing spring assembly also provides a second force component encouraging the second cylinder to maintain the longitudinal surface of the second cylinder a minimum possible distance from the rotating surface;

a note system adapted to receive different value notes, wherein the note system includes a note validator rejecting invalid notes and determining the value of valid notes, wherein the note validator is accessible to an operator to allow an operator to remove received notes prior to their successful validation, wherein the note system allows valid notes to proceed within the farebox for secure storage;

a configurable vault coupled to the coin system and to the note system, wherein the vault provides the secure storage of the valid coins and valid notes, wherein the configurable vault comprises:

a case for storing bills and coins, wherein the case includes a bill opening disposed to accept an unfolded planar face of a bill, wherein the case also includes a coin opening;

a bill storage insert having a bill storage opening disposed to accept an unfolded planar face of a bill, a bill receiving surface disposed to receive an unfolded planar face of a bill, a bill retainer disposed at the bill storage opening of the bill storage insert adapted to allow passage of a planar face of a bill when received into the bill storage insert and to retain the bill thereafter, and a biasing mechanism coupled to the bill receiving surface to tightly compress received bills between the bill receiving surface and the bill retainer, wherein the bill storage insert is adapted for insertion into the case and having means for mounting to hold the bill storage opening of the bill storage insert in juxtaposition with the bill opening of the case; and a bill shutter to close the bill opening of the case, wherein the bill shutter includes a tambour door disposed in a track on the case to allow retraction to open the bill opening of the case and expose the bill storage opening of the bill insert, and a locking mechanism disposed at an end of the tambour door to provide locking of the tambour door when in a closed position;

a note stacker coupling the note system with the configurable vault, wherein the note stacker receives valid notes from the note system and causes their tight stacking in the configurable vault;

an electronic controller coupled to the coin system and the note system, wherein the processor communicates with the coin system and the note system to receive and store information with respect to the value of valid coins and valid notes; and an operator control unit coupled to the electronic controller to allow input regarding the fare, wherein the operator control unit includes keys programmable with selected functions of the farebox.

* * * * *